US007551671B2

(12) United States Patent
Tyldesley et al.

(10) Patent No.: US 7,551,671 B2
(45) Date of Patent: Jun. 23, 2009

(54) SYSTEM AND METHOD FOR TRANSMISSION OF VIDEO SIGNALS USING MULTIPLE CHANNELS

(75) Inventors: Katherine S. Tyldesley, Tucson, AZ (US); Glen P. Abousleman, Scottsdale, AZ (US); Lina J. Karam, Phoenix, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 932 days.

(21) Appl. No.: 10/725,126

(22) Filed: Dec. 1, 2003

(65) Prior Publication Data

US 2004/0218626 A1    Nov. 4, 2004

Related U.S. Application Data

(60) Provisional application No. 60/463,573, filed on Apr. 16, 2003.

(51) Int. Cl.
*H04N 11/04* (2006.01)
(52) U.S. Cl. .............. 375/240; 375/240.16; 375/240.14; 375/240.24; 375/349; 375/260
(58) Field of Classification Search .................. 375/240, 375/240.03, 240.2, 252, 240.19, 240.27; 348/699
See application file for complete search history.

(56) References Cited

U.S. PATENT DOCUMENTS

| 5,337,086 | A |   | 8/1994 | Fujinami |
| 5,436,664 | A | * | 7/1995 | Henry ................... 375/240.16 |
| 5,581,302 | A |   | 12/1996 | Ran et al. |
| 5,933,567 | A | * | 8/1999 | Lane et al. ................. 386/68 |
| 6,625,217 | B1 | * | 9/2003 | Jacquin et al. ......... 375/240.19 |
| 6,731,712 | B1 | * | 5/2004 | Lindstrom et al. .......... 375/376 |
| 7,016,337 | B1 | * | 3/2006 | Wu et al. ..................... 370/352 |
| 2002/0176025 | A1 | * | 11/2002 | Kim et al. ................... 348/699 |
| 2002/0191695 | A1 | * | 12/2002 | Irvine et al. ............ 375/240.03 |
| 2003/0043923 | A1 | * | 3/2003 | Zhang et al. ........... 375/240.27 |

OTHER PUBLICATIONS

Tu & Tran, Context-Based Entropy Coding of Block Transform Coefficients for Image Compression, IEEE Transactions on Image Processing, vol. 11, No. 11, Nov. 2002.

* cited by examiner

*Primary Examiner*—Shuwang Liu
*Assistant Examiner*—Kabir A Timory
(74) *Attorney, Agent, or Firm*—Lowell W. Gresham; Jordan M. Meschkow; Gouri G. Nair

(57) ABSTRACT

In a communication network (20), a video encoder/decoder system (114) and an encoding method (150) facilitate transmission of video frames (116) over multiple low-data-rate channels (46). Frame data (204) is generated for each video frame (116). The frame data (204) is transformed (172) to obtain transform coefficients (212), which are assembled (174) into quadtrees (216) and separately coded (178). In addition, motion vectors (166) are split into coding blocks (188) and separately coded (190). The quadtrees (126) and the motion vectors (166) are independently distributed among the multiple channels (46) for transmission. A decoding method (360) facilitates error resilient reception of transform coefficient packets (222) and motion vector packets (244) so that lost transform coefficients (374) and/or lost motion vectors (384) can be estimated at a receiving video encoder/decoder system (114) to reconstruct a received video frames 144.

17 Claims, 19 Drawing Sheets

SYSTEM AND METHOD FOR TRANSMISSION OF VIDEO SIGNALS USING MULTIPLE CHANNELS

RELATED INVENTIONS

The present invention claims priority under 35 U.S.C. §119(e) to: "Video Coding and Transmission Over Multiple Very Low Bit-Rate Channels," U.S. Provisional Patent Application Ser. No. 60/463,573, filed 16 Apr. 2003, which is incorporated by reference herein.

The present invention is related to "System And Method For Satellite-Based Transmission Of Signals Using Multiple Channels," by Glen P Abousleman, U.S. patent application Ser. No. 10/404,791, filed 1 Apr. 2003, which is incorporated by reference herein.

TECHNICAL FIELD OF THE INVENTION

The present invention relates to the field of communication systems. More specifically, the present invention relates to a system and method for the transmission of video signals over a communication network using multiple channels.

BACKGROUND OF THE INVENTION

Technological advances in recent years have made it easier for individuals and groups in geographically disperse societies to be interconnected through physical travel and communication systems. Major advances in the telecommunications infrastructure have been developed and are continuously evolving to meet the needs of people who regularly travel, communicate, and do business internationally. For example, satellite-based global communication networks have arisen to serve the needs of global travelers and communicators. One such network, first activated in 1998, is the Iridium® commercial system. The Iridium® commercial system is a satellite-based global digital communication network designed to provide wireless communications through hand-held devices located anywhere near or on the surface of the Earth.

FIG. 1 illustrates a highly simplified diagram of a satellite-based communication network 20, dispersed over and surrounding Earth through the use of orbiting satellites 22 occupying orbits 24. Network 20 uses six polar orbits 24, with each orbit 24 having eleven satellites 22 for a total of sixty-six satellites 22. As such, network 20 exemplifies the Iridium® commercial system.

Satellites 22 communicate with radio communication individual subscriber units (ISU's) 26 over subscriber links 28. In addition, satellites 22 communicate with earth terminal/gateway systems 30, which provide access to a public switched telephone network (PSTN) 32 or other communications facilities, over earth links 34. Earth terminal/gateway systems 30 (referred to hereinafter as gateways 30) relay data packets (e.g., relating to calls in progress) between ISU's 26 and the PSTN 32 to other communication devices, such as a wireline telephone 36. Satellites 22 also communicate with other nearby satellites 22 through cross-links 40. For simplicity of illustration, only one each of ISU's 26, gateways 30, and a wireline telephone 36 are shown in FIG. 1.

With the exemplary constellation of sixty-six satellites 22, at least one of satellites 22 is within view of each point on the Earth's surface at all times, resulting in full coverage of the Earth's surface. Any satellite 22 may be in direct or indirect data communication with any ISU 26 or gateway 30 at any time by routing data through the constellation of satellites 22. Accordingly, communication network 20 may establish a communication path for relaying information through the constellation of satellites 22 between any two ISU's 26, or between ISU 26 and gateway 30.

Network 20 may accommodate any number, potentially in the millions, of ISU's 26. Subscriber links 28 encompass a limited portion of the electromagnetic spectrum that is divided into numerous channels, and are preferably combinations of L-Band frequency channels. Subscriber links 28 may encompass one or more broadcast channels 42, that ISU's 26 use for synchronization and message monitoring, and one or more acquisition channels 44 that ISU's 26 use to transmit messages to satellites 22. Broadcast channels 42 and acquisition channels 44 are not dedicated to any one ISU 26 but are shared by all ISU's 26 currently within view of a satellite 22.

Subscriber links 28 also include wireless traffic channels 46, also known as voice channels. Traffic channels 46 are two-way channels that are assigned to particular ISU's 26 from time to time for supporting real-time communications. Each traffic channel 46 has sufficient bandwidth to support a two-way voice communication. For example, each of traffic channels 46 within the Iridium® network are capable of approximately 2.4 kilobits/second (kbps) raw data throughput.

In a variety of applications, such as military, medical, humanitarian, distance learning, and others, the capability to transmit digital imagery and real-time video is highly desirable. A video coder/decoder (i.e., codec) is typically employed for the transmission of the digital imagery. A video codec compresses digital video data into an encoded form according to a given video file format or streaming video format, to facilitate transmission, storage, or encryption.

Referring to FIGS. 2-3, FIG. 2 shows a block diagram of a conventional video coder 48, and FIG. 3 shows a block diagram of a standard differential pulse code modulation (DPCM) loop 50 of video coder 48. Video coder 48 includes a motion estimation/compensation and DPCM prediction function 52, followed by a spatial image transform function 54, a quantizer function 56, and an entropy coder function 58. In general, video coder 48 receives successive video frames 60 and compresses video frames 60 to facilitate the transmission of compressed video frames 60 over a transmission channel 62.

As known to those skilled in the art, successive video frames 60 may contain the same objects (still or moving). Motion estimation/compensation and DPCM prediction function 52 examines the movement of objects in an image sequence to try to calculate vectors representing the estimated motion. For interframes, which are frames coded with reference to previous frames, motion estimation is used to predict the current video frame 60 from the previous one. Once the current video frame 60 has been predicted based on the calculated motion information, an error frame is generated by using DPCM loop 50. For intraframes, which are frames coded without reference to previous frames, the motion estimation and DPCM prediction operations are omitted, and the frame content is coded.

Following function 52, image transform function 54 concentrates the energy of video frames 60 into a smaller region. Commonly used image transforms are block-based ones, such as the discrete cosine transform (DCT), and the subband transforms, such as the discrete wavelet transform (DWT). After the transform, the transform coefficients are quantized at quantizer function 56 and encoded at entropy coder function 58. The entropy coded transform coefficients are then transmitted via transmission channel 62 to a decoder.

In a vast number of regions throughout the Earth, there exists little or no infrastructure capable of effective communication of digital imagery and video. Consequently, techniques are evolving to utilize satellite-based networks, such as the Iridium® commercial system, to transmit digital imagery and video, in addition to large data files and voice communications. Such a technique is described in the aforementioned related invention, "System And Method For Satellite-Based Transmission Of Signals Using Multiple Channels," U.S. patent application Ser. No. 10/404,791. The technique extends the capability of voice optimized traffic channels, within a wireless communication system, for the transmission of data and video.

Unfortunately, transmission of digital imagery and video over low-bit-rate, wireless links, such as traffic channels 46 is extremely problematic due to limited channel bandwidth. In addition to the limited available bandwidth, wireless traffic channels 46 have a high probability of error due to latency, fading effects, and/or channel drop out. Conventional video coders, such as video coder 48, are incapable of effectively interfacing with satellite-based communication networks to facilitate the transmission of digital imagery and real-time video under the conditions of limited bandwidth, latency, fading effects, and/or channel drop out. Accordingly, what is needed is a system and method for facilitating the transmission of video in a satellite-based communication network that operate over multiple wireless channels, and account for the latency, fading effects, and limited available bandwidth inherent in such a network.

SUMMARY OF THE INVENTION

Accordingly, it is an advantage of the present invention that a system and method are provided for satellite-based transmission of video signals using multiple wireless channels.

It is another advantage of the present invention that a system and method are provided that are resilient to packet loss on any individual wireless channel, as well as to loss of any individual wireless channel.

Another advantage of the present invention is that a system and method are provided for transmission of video signals that can effectively accommodate transmission latency within a satellite-based communication network.

Yet another advantage of the present invention is that implementation of the system and method are transparent to the existing infrastructure of the satellite-based communication network.

The above and other advantages of the present invention are carried out in one form by a method of facilitating transmission of video frames over multiple channels in a wireless communication network. The method calls for generating, for each of the video frames, frame data representative of the video frame, and transforming the frame data to obtain transform coefficients of the frame data. The method further calls for assembling quadtrees of the transform coefficients, each of the quadtrees including a group of the transform coefficients associated with an equivalent spatial location in the frame data. The quadtrees are separately coded to form coded quadtree coefficient groups, and the coded quadtree coefficient groups are distributed among the multiple channels for transmission.

The above and other advantages of the present invention are carried out in another form by a coder/decoder system for facilitating transmission of video frames over multiple channels in a wireless communication network. The system includes an input for receiving each of the video frames, and a processor in communication with the input for generating frame data representative of each video frame. A wavelet transformer is in communication with the processor for transforming the frame data to obtain wavelet coefficients of the frame data. A quadtree-based compressor receives the wavelet coefficients and assembles quadtrees of the wavelet coefficients, each of the quadtrees including a group of wavelet coefficients associated with an equivalent spatial location in the frame data. A coder separately codes the quadtrees to form coded quadtree coefficient groups, and an output interface, in communication with the coder, receives the coded quadtree coefficient groups. The output interface assigns the coded quadtree coefficient groups to the multiple channels such that adjacent portions of the frame data will be transmitted over different ones of the multiple channels.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
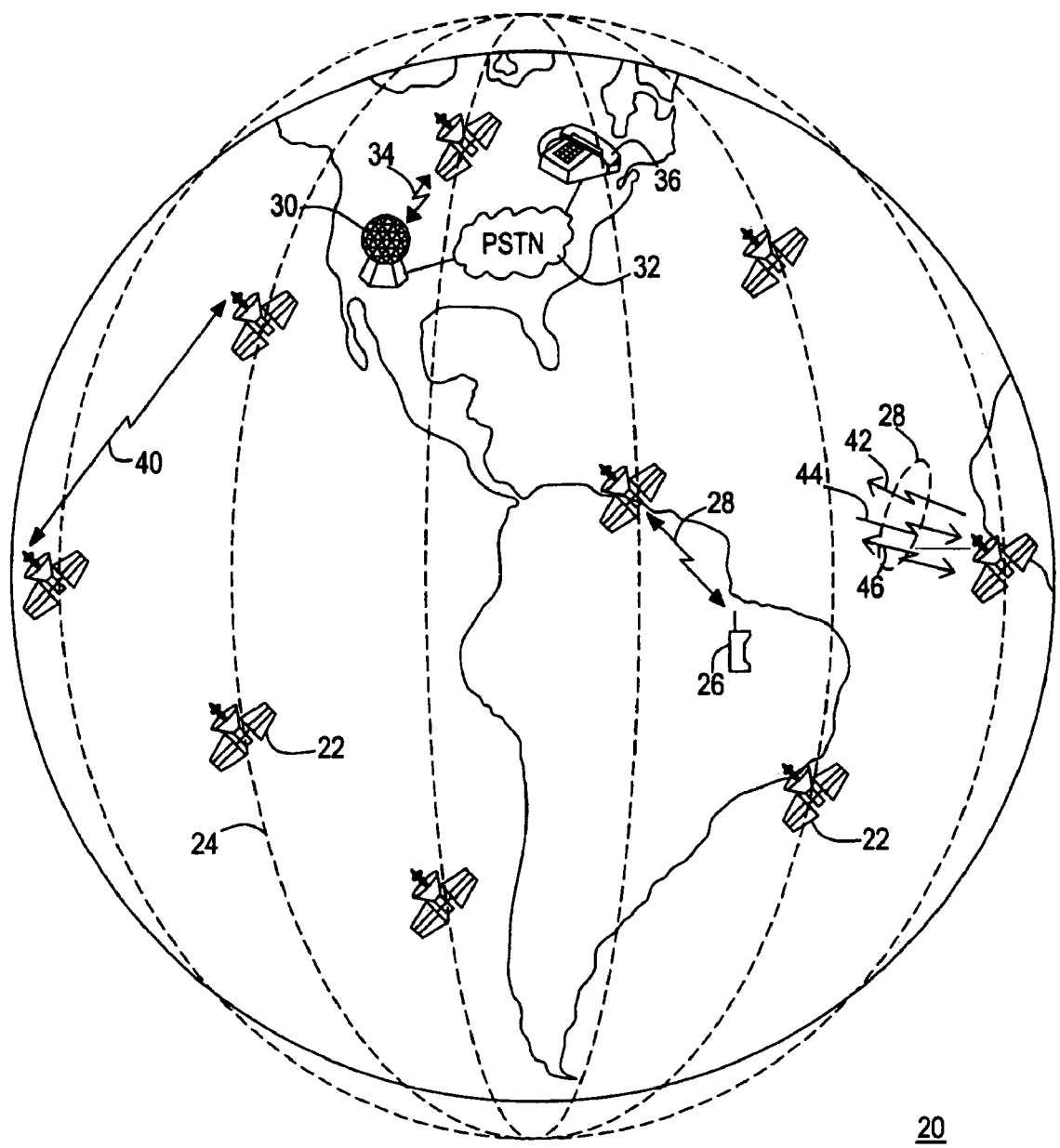
FIG. 1 shows a highly simplified diagram of a satellite-based communication network.
Figure 2:
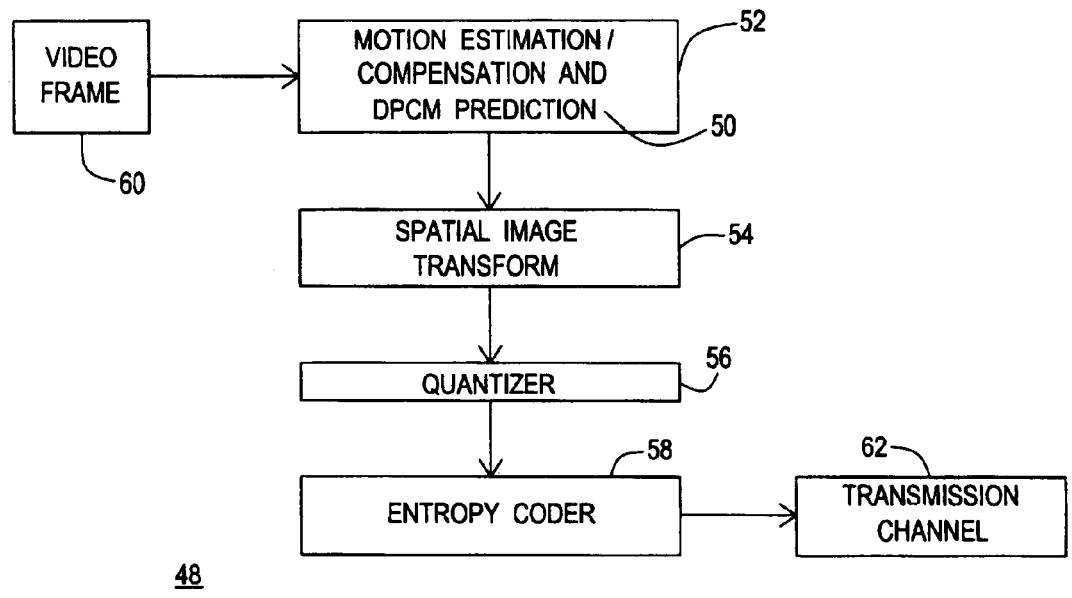
FIG. 2 shows a block diagram of a conventional video coder.
Figure 4:
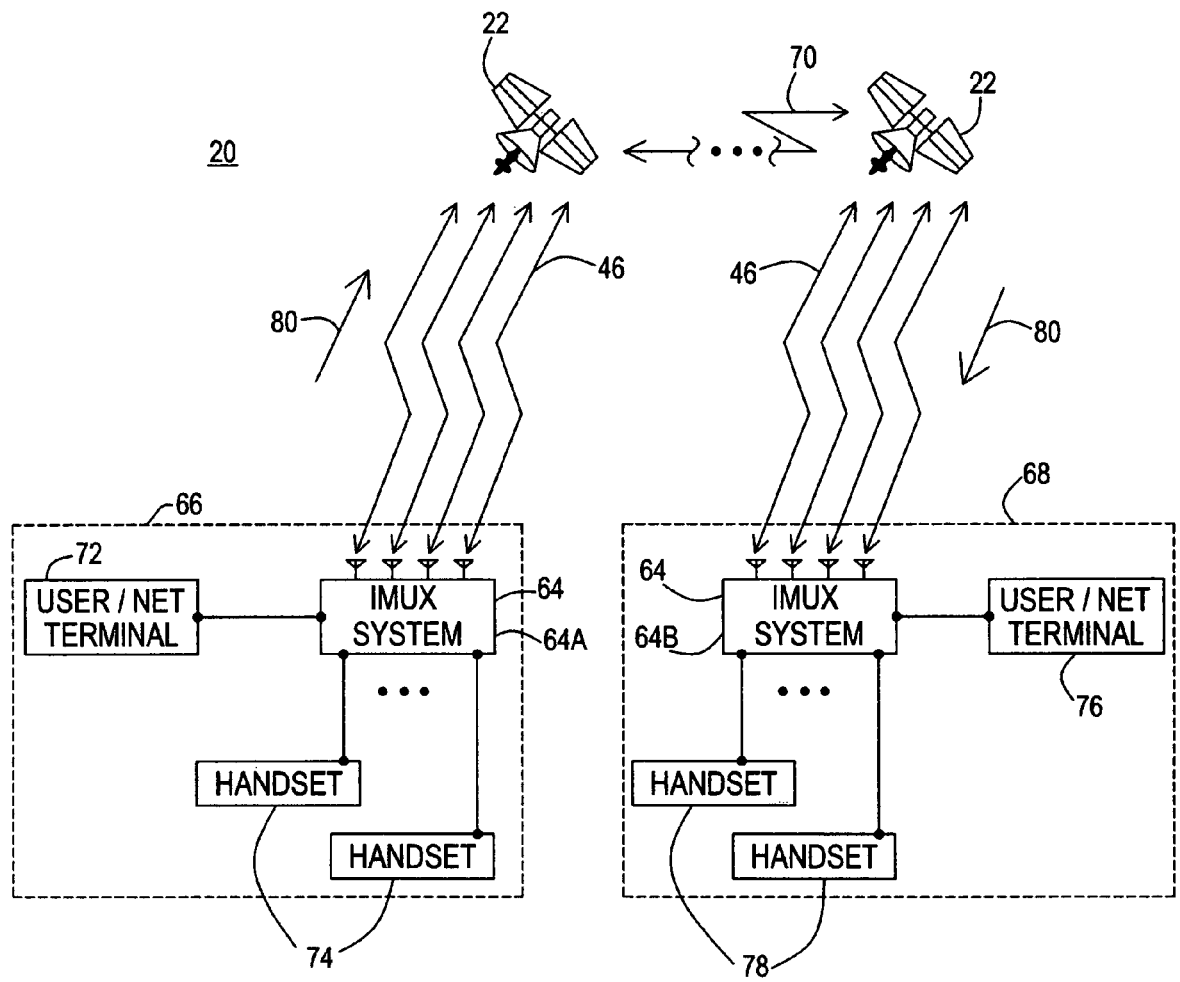
FIG. 4 shows a simplified diagram of a portion of the satellite-based communication system in which inverse multiplexer (IMUX) systems are employed.

Referring to FIGS. 1 and 4, FIG. 4 shows a simplified diagram of a portion of satellite-based communication network 20 in which inverse multiplexer (IMUX) systems 64 are employed. IMUX systems 64 are adapted for use with a satellite-based communication network, such as network 20, exemplifying the Iridium® commercial system. IMUX systems 64 extend the capability of voice-optimized wireless traffic channels 46, within network 20, for the transmission of data and video, without the addition of terrestrial or airborne network infrastructure. The present invention is adapted for use with IMUX systems 64 for effectively utilizing wireless channels for the transmission of video signals. For clarity of understanding, IMUX systems 64 will be discussed below.

Although the present invention is described in terms of its use with the Iridium® commercial system, the present invention is not limited to such a use. Rather, the present invention is applicable to land-based wired or wireless networks, as well as to other existing or upcoming satellite-based communication networks. The existing or upcoming satellite-based communication networks may have low-earth or medium-earth orbits, may entail orbits having any angle of inclination (e.g., polar, equatorial or another orbital pattern), and may utilize more or fewer orbits. The present invention is also applicable to satellite constellations where full coverage of the Earth is not achieved (i.e., where there are "holes" in the communications coverage provided by the constellation) and constellations where plural coverage of portions of the Earth occur (i.e., more than one satellite is in view of a point on the Earth's surface). In addition, all gateways 30 and ISUs 26 of network 20 are or may be in data communication with other telephonic devices dispersed throughout the world through PSTN 32 and/or conventional terrestrial cellular telephone devices coupled to the PSTN through conventional terrestrial base stations.

Network 20 includes a first communication station 66 and a second communication station 68. First and second communication stations 66 and 68 may be located on or near the surface of the earth, in isolated or populous areas, and remote from or nearby one another. First and second communication stations 66 and 68, respectively, are deployed in a "mobile-to-mobile" configuration. In the "mobile-to-mobile" configuration, first and second communication stations 66 and 68 are enabled to communicate with one another. But nothing requires stations 66 and 68 to move. The mobile-to-mobile link may be routed through one of gateways 30, which yields an approximate usable data rate of 2.4 kbps for the exemplary Iridium®-based network. Alternatively, the mobile units communicate with one another, completely bypassing one of gateways 30. As a consequence of the mobile-to-mobile configuration, limited gateway modems are freed up for other users, and maximum data throughput is increased from the data rate of 2.4 kbps over each of traffic channels 46 to approximately 3.4 kbps for the exemplary Iridium®-based network.

Alternatively, first communication station 66 and a third communication station (not shown), may be deployed in a "mobile-to-PSTN" configuration. In the "mobile-to-PSTN" configuration, first communication station 66 and the third communication station are enabled to communicate with one another via satellite-based communication network 20 and PSTN 32 infrastructure. An exemplary "mobile-to-PSTN" configuration is discussed in detail in connection with the related invention "System And Method For Satellite-Based Transmission Of Signals Using Multiple Channels," U.S. patent application Ser. No. 10/404,791.

FIG. 4 further depicts a discontinuous bi-directional arrow 70 between satellites 22. This discontinuous arrow 70 indicates that a number of cross-links 40 and satellites 22 may be employed to form the communication path between first communication station 66 and second communication station 68, as known to those skilled in the art. Alternatively, and as known to those skilled in the art, the communication path need not include two or more satellites 22. Rather, the communication path may include only one of satellites 22 with switching taking place at the satellite to another antenna beam.

First communication station 66 includes a first one of IMUX systems 64, referred to hereinafter as first IMUX system 64A. First communication station 66 also includes a first user/net terminal 72 and handsets 74 in communication with first IMUX system 64A. Similarly, second communication station 68 includes a second one of IMUX systems 64, referred to hereinafter as second IMUX system 64B. A second user/net terminal 76 and handsets 78 are in communication with second IMUX system 64B. User/net terminals 72 and 76 represent any of a wide variety of equipment, including any form of computer, telecommunication, and/or input/output device, which may provide or receive data and or video in any of a wide variety of formats. Such equipment include interface devices for coupling stations 66 and/or 68 to a local or wide area network, the Internet, phone lines, and the like.

For simplicity of illustration, the present invention is described in terms of a transmit signal, represented by arrows 80, originating at first IMUX system 64A for transmission toward second IMUX system 64B. However, it should be understood that each of IMUX systems 64 within network 20 functions similarly.

IMUX systems 64 maintain the capability of two-way voice communication provided by network 20, and concurrently facilitate the transmission of large data files and real-time video imagery using network 20. A transmitting one of IMUX systems 64, i.e., first IMUX system 64A, facilitates the transmission of large data files and real-time video imagery by splitting an input data or video signal (discussed below) received via first user/net terminal 72, and transmitting different portions of the data or video signal as transmit signal 80 over separate traffic channels 46. A receiving one of IMUX systems 64, i.e., second IMUX system 64B, combines the different portions of transmit signal 80 to recover the original data or video signal. The net result of such a system is that the effective bandwidth multiplication is directly proportional to the number of traffic channels 46 used.

Figure 5:
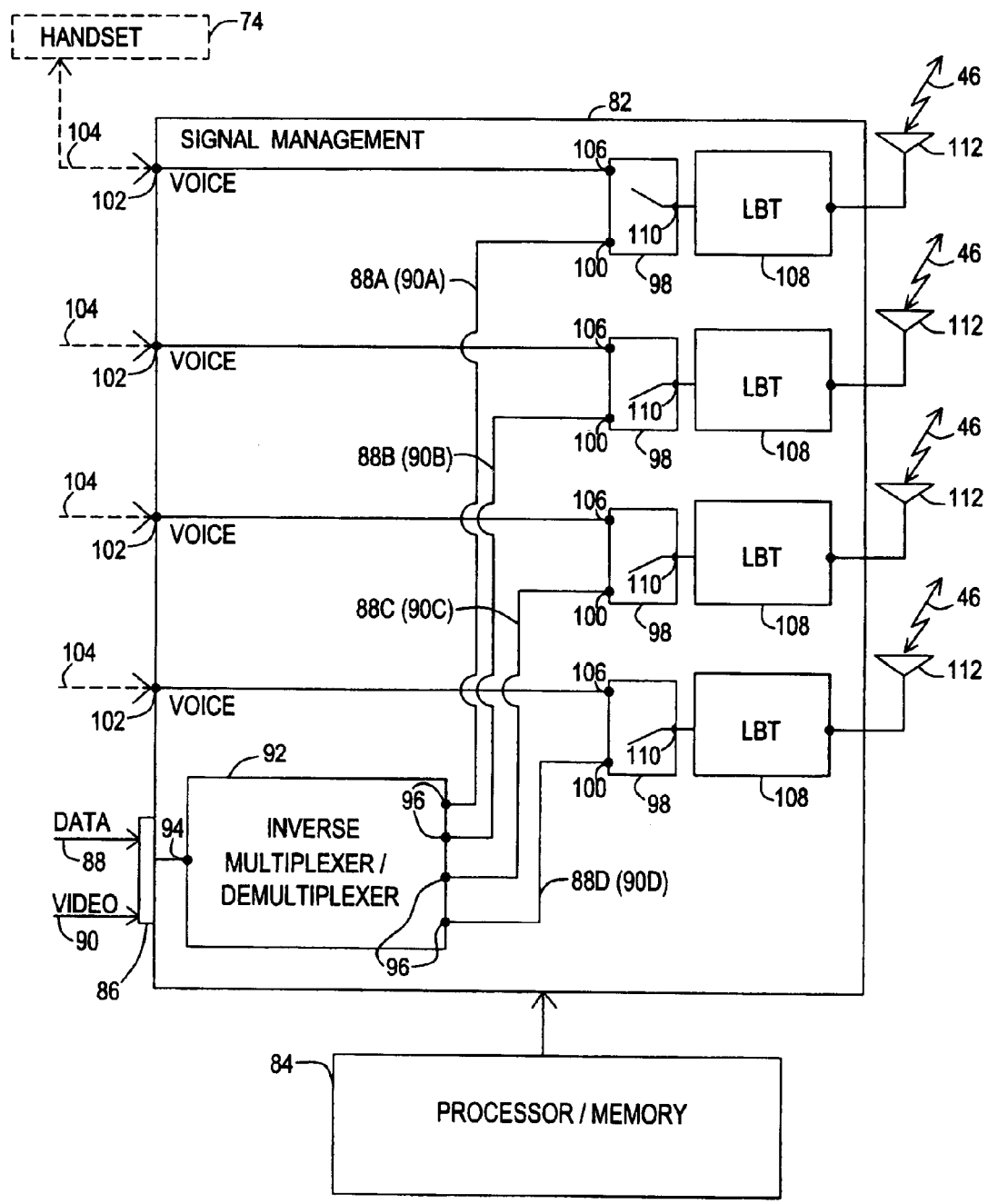
FIG. 5 shows a highly simplified block diagram of functional elements of one of the IMUX systems of FIG. 4.

FIG. 5 shows a block diagram of one of IMUX systems 64, i.e., first IMUX system 64A. First IMUX system 64A generally includes a signal management element 82 and a processor/memory element 84 in communication with signal management element 82.

Signal management element 82 includes a data input/output (I/O) port 86 for receiving a data signal 88 and/or a video signal 90 for transmission over network 20 (FIG. 1). Data signal 88 may be a large data file previously generated by and/or collected at first user/net terminal 72. Video signal 90 may be imagery generated at first user/net terminal 72 (FIG. 4) using a multimedia software application, such as that used for videoconferencing. Data I/O port 86 may include one or more receptacles to accommodate, for example, an Ethernet connection, a serial connection, a Universal Serial Bus (USB) connection, and so forth.

An inverse multiplexer/demultiplexer 92 is in communication with data I/O port 86 via an IMUX input 94. IMUX 92 further includes IMUX outputs 96, a number of which corresponds to a number of wireless traffic channels 46 over which first IMUX system 64A is configured to communicate. IMUX 92 may be implemented as an application specific integrated circuit, or may be implemented in a digital signal processor, and is preferably a commercially available device.

In an exemplary embodiment, first IMUX system 64A is a four channel IMUX system 64. Accordingly, inverse multiplexer/demultiplexer 92 includes four IMUX outputs 96, each of which are in communication with four corresponding signal selectors 98, as represented by first inputs 100. Although IMUX system 64A is a four channel IMUX system 50, it should be understood that a different number of channels may be employed within one of IMUX systems 64. In addition, a pair of four channel IMUX systems may be arranged in a master/slave configuration to achieve an eight channel IMUX system. Additionally, N IMUX systems 64 may be connected to one another to provide a 4N channel IMUX system.

Signal management element 82 further includes one or more voice ports 102 for receiving a voice signal 104. In the exemplary four channel embodiment, IMUX system 64A may include four voice ports 102 for accommodating up to four individual voice signals 104 from handsets 74. Hence, the four voice ports 102 are in communication with four corresponding signal selectors 98, as represented by second inputs 106. Signal selectors 98 are in communication with corresponding L-band transceivers 108 (represented by outputs 110), which in turn, are in communication with external antennas 112.

Processor/memory element 84 controls L-band transceivers 108 and coordinates the flow of data signal 88, video signal 90, and voice signals 104 to and from first IMUX system 64A. As such, processor/memory element 84 is responsive to the detection of data signal 88, video signal 90, and voice signals 104 for controlling the flow of communication over wireless traffic channels 46.

Inverse multiplexing is a process of dividing a high-bandwidth data stream into multiple subsectional signals that can be routed independently through a carrier's network. IMUX 92 functions to split data signal 88 and/or video signal 90 into a number of subsectional signals 88A(90A), 88B (90B), 88C (90C), and 88D (90D) and to process and present subsectional signals 88A(90A), 88B (90B), 88C (90C), and 88D (90D) to first inputs 100 of signal selectors 98. IMUX 92 may also perform error detection and synchronization procedures as required, utilizing methodology known to those skilled in the art.

The number of subsectional signals 88A(90A), 88B (90B), 88C (90C), and 88D (90D) is determined in response to a number of wireless traffic channels 46 that may be available for transmission of subsectional signals 88A(90A), 88B (90B), 88C (90C), and 88D (90D). Subsectional signals 88A (90A), 88B (90B), 88C (90C), and 88D (90D) are subsequently realigned at the far end, i.e., by another of IMUXs 92 at another of IMUX systems 64, into the original high-bandwidth data signal 88 and/or video signal 90.

Exemplary methodology for splitting data signal 88 into subsectional signals 88A, 88B, 88C, and 88D, and processing and presenting subsectional signals 88A, 88B, 88C, and 88D to first inputs 100 of signal selectors 98 is discussed in detail in connection with the related invention "System And Method For Satellite-Based Transmission Of Signals Using Multiple Channels," U.S. patent application Ser. No. 10/404,791. However, the present invention need not be limited to such methodology. Rather, other existing or upcoming inverse multiplexing systems that split a first transmit signal into multiple subsectional signals may alternatively be employed. The related invention "System And Method For Satellite-Based Transmission Of Signals Using Multiple Channels," U.S. patent application Ser. No. 10/404,791, also presents methodology for selecting between the transmission of data signal 88, video signal 90, and voice signals 104.

The present invention provides a system and methodology for compressing and splitting video signal 90 into subsectional signals 90A, 90B, 90C, and 90D, and presenting subsectional signals 90A, 90B, 90C, and 90D to first inputs 100 of signal selectors 98. As such, further discussion regarding the transmission of data signal 88 and/or voice signals 104 is not provided herein.

Figure 6:
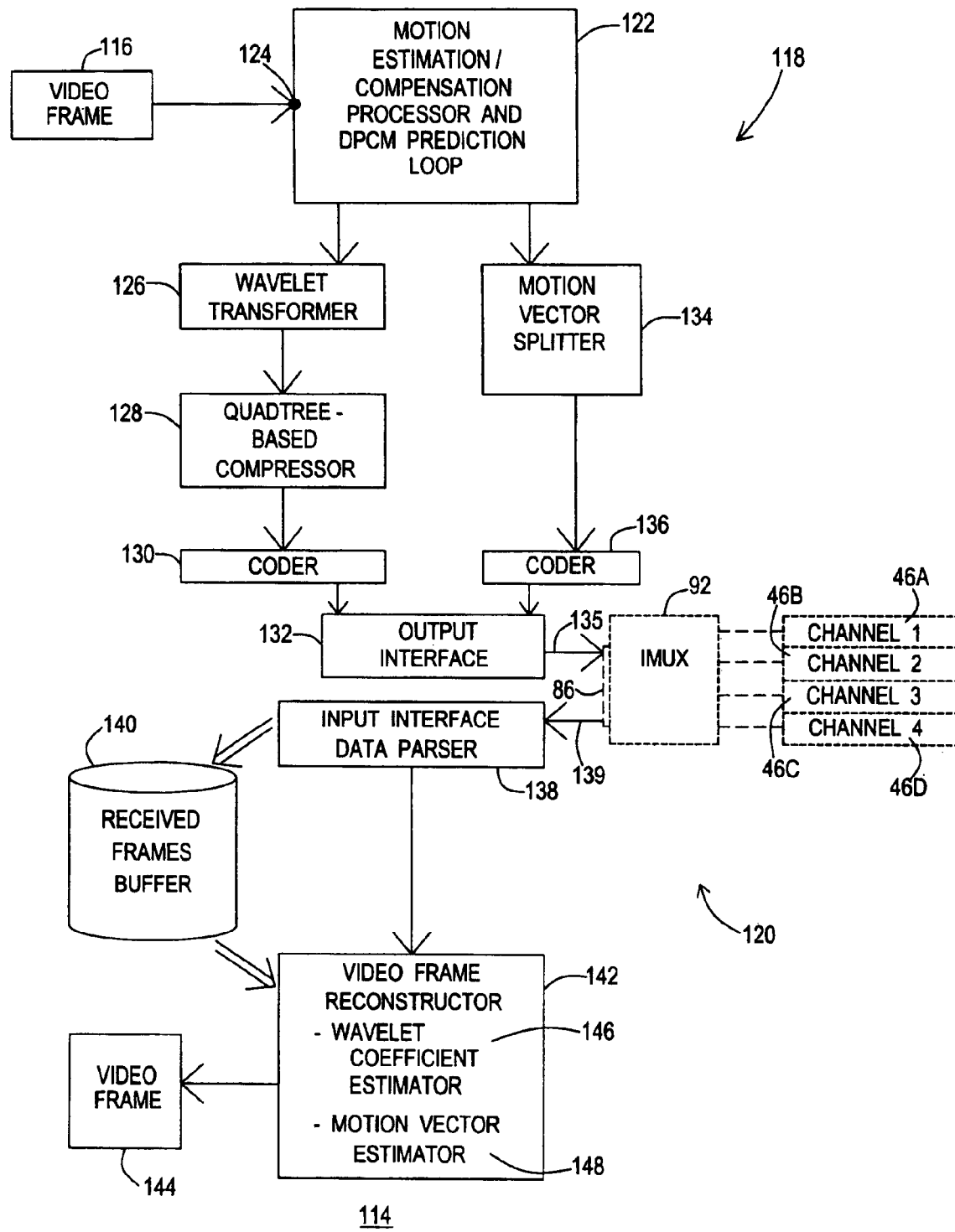
FIG. 6 shows a block diagram of a video encoder/decoder system employed with the IMUX system in accordance with a preferred embodiment of the present invention.

FIG. 6 shows a highly simplified block diagram of functional elements of a video encoder/decoder system 114 employed with IMUX system 64 (FIG. 4) in accordance with a preferred embodiment of the present invention. System 114 may be a separate unit interposed between user/net terminal (FIG. 4) and first IMUX system 64A (FIG. 4), and similarly, between user/net terminal 76 (FIG. 4) and second IMUX system (FIG. 4). Alternatively video encoder/decoder system 114 may be incorporated into either of terminal 72 or first IMUX system 64A, and similarly, in either of terminal 76 or second IMUX system 64B.

Video encoder/decoder system 114 is an error-resilient, wavelet-based, multiple description video coding system for facilitating transmission of video frames 116 over multiple wireless channels 46 of satellite-based communication network 20 (FIG. 1). Multiple description video coding is an error resilient source coding scheme that generates multiple encoded bitstreams of the source that can be decoded independently with the aim of providing a reasonable reconstruction quality of the source when only one bitstream (i.e., one description) is received, and improved quality when multiple bitstreams (i.e., multiple descriptions) are available. Video encoder/decoder system 114 advantageously operates over the multiplicity of wireless channels 46, accounting for latency, fading characteristics, and limited available bandwidth.

Video encoder/decoder system 114 generally includes an encoder section 118 and a decoder section 120. Encoder section 118 and decoder section 120 are described separately herein for clarity of illustration. Encoder and decoder sections 118 and 120 may be implemented as an application specific integrated circuit, or may be implemented in a digital signal processor.

The functional elements of encoder section 118 include a motion estimation/compensation processor and differential pulse code modulation (DPCM) loop function, termed "processor function 122" herein for brevity. Processor function 122 is configured to receive, via an input 124, successive video frames, represented by a single one of video frames 116. Video frames 116 may be digital imagery, real-time video, or another high bandwidth streaming data format. The functional elements of encoder section 118 further include a wavelet transformer 126 in communication with processor function 122, a quadtree-based compressor 128 in communication with wavelet transformer 126, a first coder 130, and an output interface 132. Output interface 132 is subsequently in communication with data input/output port 86 of IMUX 92. In addition, the functional elements of encoder section 118 include a motion vector splitter 134 in communication with processor function 122, and a second coder 136 interposed between motion vector splitter 134 and output interface 132. Output interface 132 is configured to forward video packets 135, representative of video frame 116 toward data input/output port 86 of IMUX 92 for subsequent transmission via wireless channels 46. The functional elements of encoder section 118 are described in connection with FIGS. 7-18.

The functional elements of decoder section 120 include an input interface data parser 138 in communication with data input/output port 86 of IMUX 92 for receiving video packets 139 representative of successive video frames from another system 114. In addition, input interface data parser 138 is configured to separate data (discussed below) received in video packets 139 and organize the data in accordance with a received frames buffer 140. Decoder section 120 further includes a video frame reconstructor 142 in communication with received frames buffer 140, for reconstructing and outputting received video frames 144 in response to the data of received frames buffer 140. Video frame reconstructor 142 further includes a wavelet coefficient estimator function 146 and a motion vector estimator function 148. The functional elements of decoder section 120 are described in connection with FIGS. 23-27.

As mentioned above, video encoder/decoder system 114 is configured to operate with IMUX systems 64 (FIG. 4) to facilitate transmission of video frames over multiple wireless voice-optimized traffic channels 46. The cooperative interaction of encoder section 118 and decoder section 120 with IMUX system 64 (FIG. 5) for transmitting video packets 135 related to video frame 116 and for receiving video packets 136 related to received video frame 144 is described in connection with FIGS. 19-22.

Encoding Process

Figure 7:
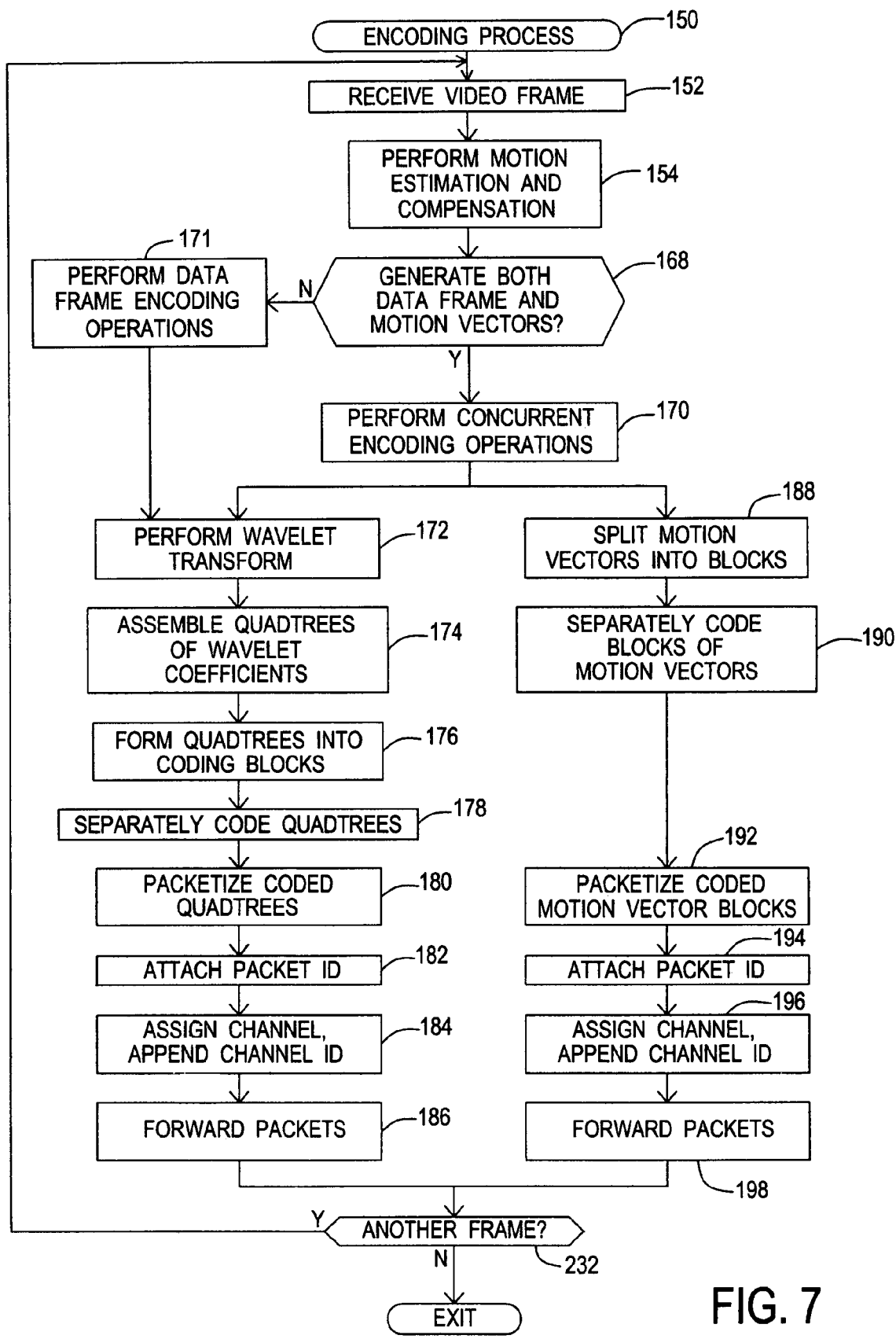
FIG. 7 shows a flow chart of an encoding process performed by the system of FIG. 6.

Referring to both FIGS. 6-7, FIG. 7 shows a flow chart of an encoding process 150 performed by encoding section 118 of video encoder/decoder system 114 (FIG. 6). Encoding process 150, executed at encoder section 118 of video encoder/decoder system 114, effectively divides and compresses a received video stream for transmission over multiple wireless channels 46, such that lost coefficients and motion data (discussed below) can be interpolated at a decoder section 120 of a receiving one of IMUX systems 64 (FIG. 4).

Encoding process 150 begins with a task 152. At task 152, one of a series of successive video frames 116 of a video stream is received.

In response to task 152, a task 154 is initiated to perform motion estimation and compensation. More specifically, processor function 122 performs motion estimation/compensation processing and differential pulse code modulation (DPCM) loop functions to obtain frame data representative of video frame 116.

In a preferred embodiment, motion estimation and compensation is performed using a diamond search pattern. The diamond search pattern is a fast motion estimation method developed for use in H.263+, a low bitrate video coding standard, as well as, MPEG 1/MPEG 2 international standards. The diamond search pattern method can decrease computational complexity, relative to a full search method, while still yielding reasonable performance. Although the diamond search pattern method is preferred, alternative motion estimation and compensation techniques may be contemplated.

Figure 8:
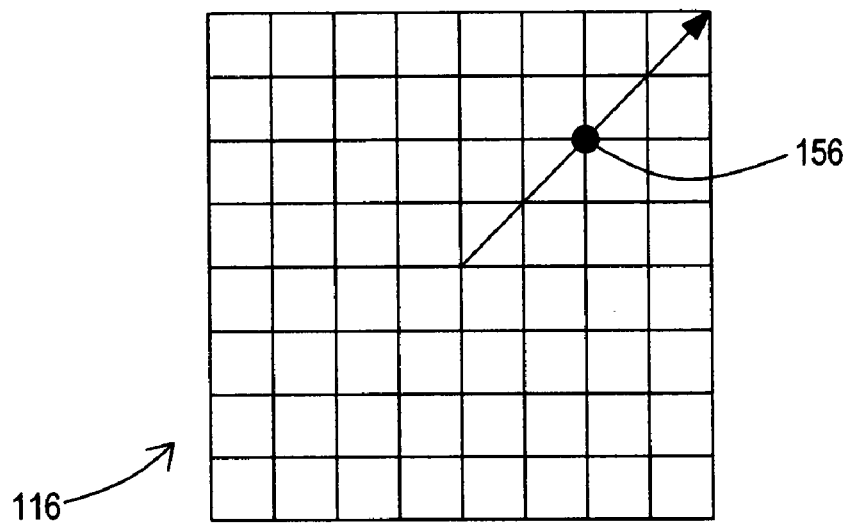
FIG. 8 shows a graphic representation of a video frame in which a start point is delineated for a diamond search fast motion estimation method performed by the encoding process of FIG. 7.
Figure 9:
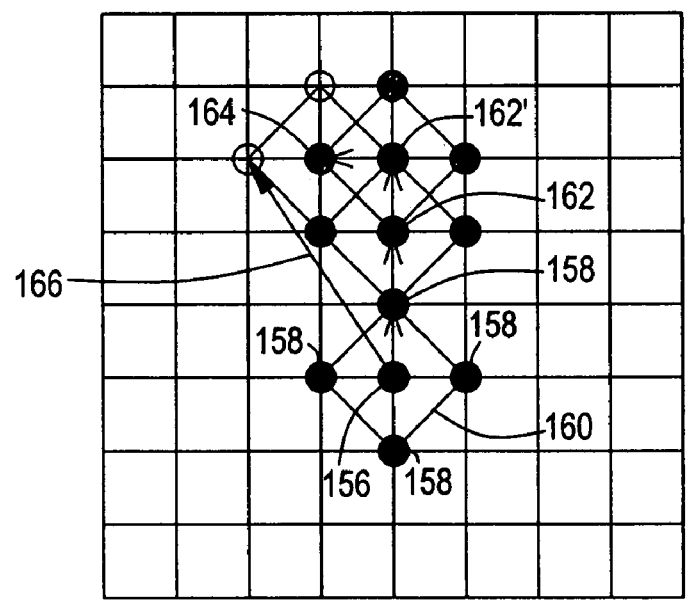
FIG. 9 shows a graphic representation of search points surrounding the start point of FIG. 8.

Referring to FIGS. 8-9 in connection with task 154, FIG. 8 shows a graphic representation of video frame 116 in which a start point 156 is delineated for a diamond search fast motion estimation method performed at task 154 of encoding process 150 (FIG. 7). FIG. 9 shows a graphic representation of search points 158 surrounding start point 156. The diamond search begins at start point 156, predicted by the motion vectors of the previous video frame 116 scaled by one half, as shown in FIG. 8. The points represent the top left corner of a 16 by 16 pixel block. The difference between the two pixel blocks is computed using the sum of absolute differences (SAD) at four points, i.e., search points 158, surrounding start point 156, and at start point 156 itself. For example, if start point 156 is given by $(x_{orig}, y_{orig})$, the four search points 158 surrounding start point 156 form a diamond pattern 160 and are given by $(x_{orig}+1, y_{orig})$, $(x_{orig}, y_{orig}+1)$, $(x_{orig}-1, y_{orig})$, and $(x_{orig}, y_{orig}-1)$.

Let $B_{cur}$ be the block of the current image and $B_{ref}$ be the block of the previous image. The sum of absolute differences between these two blocks is given by:

$$SAD = \sum_{n_1=0}^{15} \sum_{n_2=0}^{15} |B_{cur}(n_1, n_2) - B_{cur}(n_1, n_2)| \quad (1)$$

The point which gives the minimum distance, i.e., SAD value $(x1_{min}, y2_{min})$, becomes a new center point 162 for the next search. The SAD value is stored into $D1_{min}$. Another diamond search is conducted and the center point is again updated with a new center point 162' which gives the minimum SAD value $(x2_{min}, y2_{min})$. The previous value of $D1_{min}$ is stored in $D2_{min}$ and $D1_{min}$ is replaced by the new minimum SAD value. A third diamond search is performed with the newest center point 162'. The point which gives the minimum SAD distance $(x3_{min}, y3_{min})$ is found. $D2_{min}$ is transferred to $D3_{min}$, $D1_{min}$ is transferred to $D2_{min}$, and $D1_{min}$ is updated with the new minimum SAD value. If the conditions $D2_{min} \leq D1_{min}$ and $D3_{min} \leq D1_{min}$ are satisfied, the search terminates. Otherwise, the diamond search continues with the center point and the minimum distance values updating as previously described. Once a final center point 164 is found, motion vectors, represented by an arrow 166 in FIG. 9, are given by:

$$\vec{x}_{motion} = x_{min} - x_{orig} \quad (2)$$

$$\vec{y}_{motion} = y_{min} - y_{orig} \quad (3)$$

Figure 3:
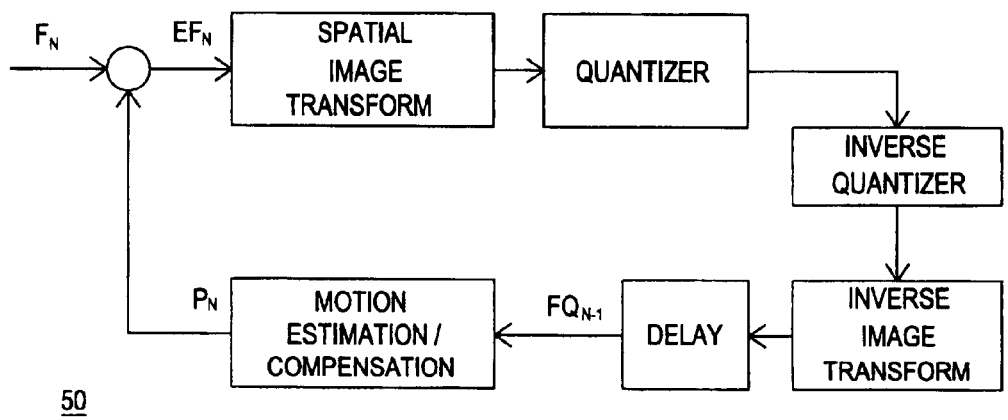
FIG. 3 shows a block diagram of a standard differential pulse code modulation (DPCM) function of the video coder of FIG. 2.

To create the motion compensated frame, blocks from the previous frame are moved to the location given by motion vectors 166. Let $BQ_{(i,j)}$ represent a 16 by 16 block from the previous video frame $FQ_{n-1}$ which has been subjected to quantization and inverse quantization to generate the block as it is seen at decoder section 120 of another system 114. This block has a top left corner located at (i,j). To create the predicted frame $P_n$, the block will be moved to the location given by:

$$(i + \vec{x}_{motion}(i,j), j + \vec{y}_{motion}(i,j)) \quad (4)$$

where $\vec{x}_{motion}(i,j)$ is the calculated horizontal one of motion vectors 166 of $BQ_{(i,j)}$ and $\vec{y}_{motion}(i,j)$ is the calculated vertical one of motion vectors 166 of $BQ_{(i,j)}$. This process is repeated for all blocks in the reference frame $FQ_{n-1}$. The error frame $EF_n$ is then generated by subtracting pixel by pixel the predicted frame $P_n$ from the current frame $F_n$, as shown in DPCM function 50 of FIG. 3.

Referring back to FIGS. 6-7, following task 154, a query task 168 determines whether the execution of task 154 resulted in the generation of both a data frame (i.e., an error frame) and motion vectors 166 (FIG. 9). The execution of task 154 can result in any of three types of video frames 116 that then are subsequently encoded. These three types of video frames 116 include intraframes (i.e., frames coded without reference to previous frames), motion-compensated interframes (i.e., frames coded with reference to previous frames, in which there are associated motion vectors 166), and non-motion-compensated interframes (i.e., frames coded with reference to previous frames, in which there are no associated motion vectors 166).

When query task 168 determines that both an error frame and motion vectors 166 where generated, encoding process 150 proceeds to a task 170. Task 170 enables the execution of a series of concurrent encoding operations in order to encode both the error frame and the corresponding motion vectors 166 (FIG. 9). Alternatively, when query task 168 determines that no motion vectors 166 were generated for the received one of video frames 116, process 150 proceeds to a task 171. Task 171 enables the execution of encoding operations to encode only the error frame.

For clarity of explanation, tasks 172, 174, 176, 178, 180, 182, 184, 186 describe a series of operations that are performed to encode the error frame in response to either of tasks 170 and 171. In addition, tasks 188, 190, 192, 194, 196, and 198 describe a series of operations that are performed to encode motion vectors 166 in response to only task 170. In accordance with task 170, these concurrent encoding operations independently perform compression operations on both the error frame and motion vectors 166. Tasks (i.e., tasks 172, 174, 176, 178, 180, 182, 184, 186) associated with encoding the error frame will first be presented below, followed by those tasks (i.e., tasks 188, 190, 192, 194, 196, and 198) associated with encoding motion vectors 166.

In response to either of tasks 170 and 171, task 172 performs an image transform to concentrate the energy of the image (i.e., error frame or frame content) into a smaller region. More specifically, wavelet transformer 126 performs transform functions to obtain transform coefficients.

In a preferred embodiment, encoder section 118 utilizes an iterated subband transform, known as a discrete wavelet transform. The discrete wavelet transform converts frame data (i.e., the error frame or frame content) to the space-scale domain. Wavelet transforms separate the low and high frequencies of the frame data, allowing them to be analyzed separately or coded differently. Typically a standard two channel analysis filter bank employs a low pass filter, $h_0$, and a high pass filter, $h_1$. The low pass filter produces a subsampled version of the original image. The high pass filter creates a more detailed representation of the high frequency components of the image. After both the low pass and high pass filters, the signal is decimated by two so that the total number of image samples does not increase. For image processing, a separable discrete wavelet transform is used so that the same filter bank can be applied to both the rows and columns of an image to create a total of four subbands. Although the discrete wavelet transform is preferred, alternative transform techniques may be contemplated.

Figure 10:
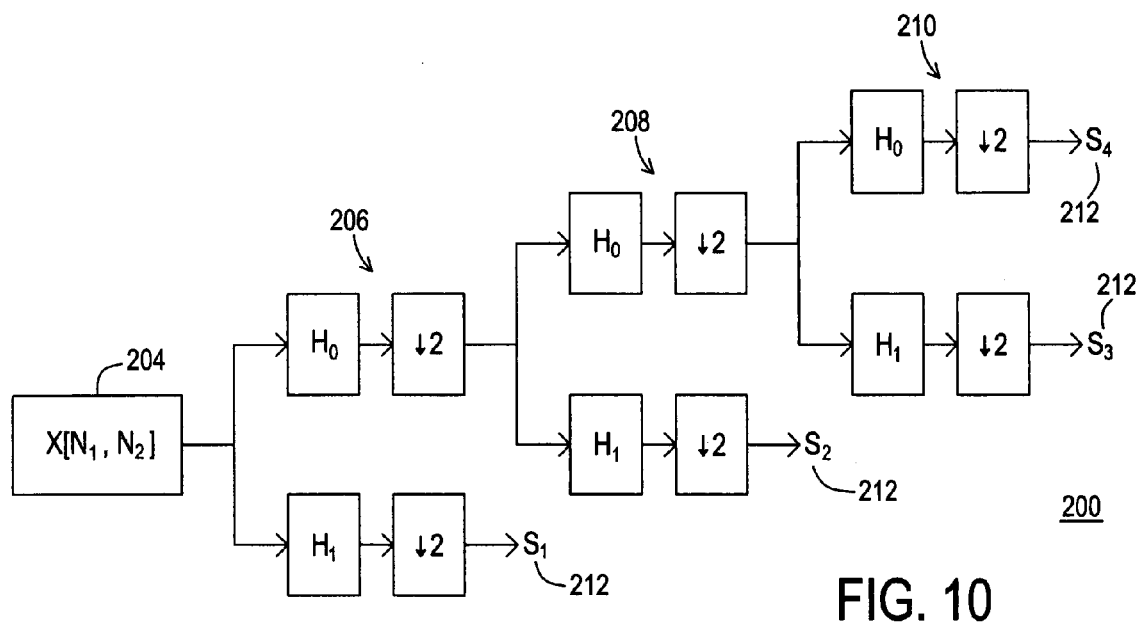
FIG. 10 shows a block diagram of an analysis filter bank of a discrete wavelet transform function of the system of FIG. 6.
Figure 11:
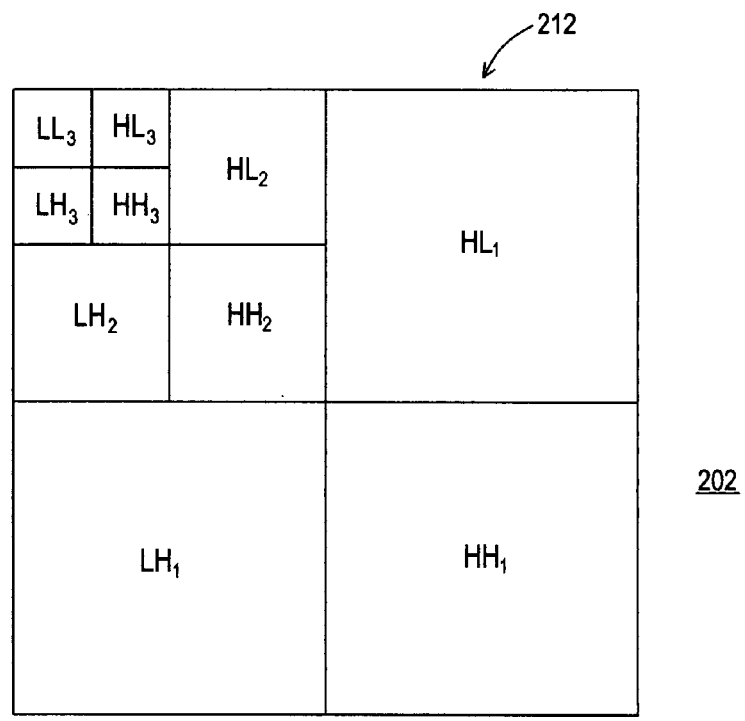
FIG. 11 shows a graphic representation of a three level subband decomposition formed through the execution of the encoding process of FIG. 7.

Referring to FIGS. 10-11 in connection with task 172, FIG. 10 shows a block diagram of an analysis filter bank 200 of a discrete wavelet transform function, i.e., wavelet transformer 130 (FIG. 6), of video encoder/decoder system 114 (FIG. 6). FIG. 11 shows a graphic representation of a three level subband decomposition 202 formed through the execution of task 172 of encoding process 150. Wavelet transformer 126 of encoding section 118 (FIG. 6) desirably utilizes a finite impulse response 9/7 biorthogonal wavelet transform, known to those skilled in the art. This transform has a linear phase which preserves the spatial integrity of error frame 204.

As shown in FIG. 10, frame data, for example, an error frame 204, is input into a first level 206 of filter bank 200, employing a low pass filter, $H_0$, and a high pass filter, $H_1$. The low pass filter, $H_0$, produces a subsampled version of error frame 204 and the high pass filter, creates a more detailed representation of the high frequency components of error frame 204. The low frequency components of error frame 204 contain the most energy and are generally the most important for visual perception of the original video frame 116, represented by error frame 204.

Accordingly, the lowest frequency subband of error frame 204 which has been low pass filtered along the rows and columns (subband $LL_1$) contains the most information of any subband, so analysis filter bank 200 is iterated on this subband, as shown in FIG. 10. That is, this lowest frequency subband (subband $LL_1$) is input into a second level 208 of filter bank 200, also employing a low pass filter, $H_0$, and a high pass filter, $H_1$. Again, the lowest frequency subband which has been low pass filtered along the rows and columns at second level 208 (subband $LL_2$) contains the most information of any subband. Accordingly, this lowest frequency subband (subband $LL_2$) is input into a third level 210 of filter bank 200, also employing a low pass filter, $H_0$, and a high pass filter, $H_1$.

When analysis filter bank 200 has been applied three times, it creates three level subband decomposition 202, i.e., ten subbands of wavelet coefficients 212.

Referring back to FIGS. 6-7, following task 172, task 174 assembles quadtrees of wavelet coefficients 212 (FIG. 10) to facilitate coding of error frame 204 (FIG. 10). That is, quadtree compressor 128 (FIG. 6) performs quadtree-based compression functions. A quadtree is the expression of a two dimensional object, such as wavelet coefficients 212, as a tree structure of quadrants which are formed by recursively subdividing each non-homogeneous quadrant until all quadrants are homogeneous with respect to a selected property, or until a predetermined cut-off 'depth' is reached.

Figure 12:
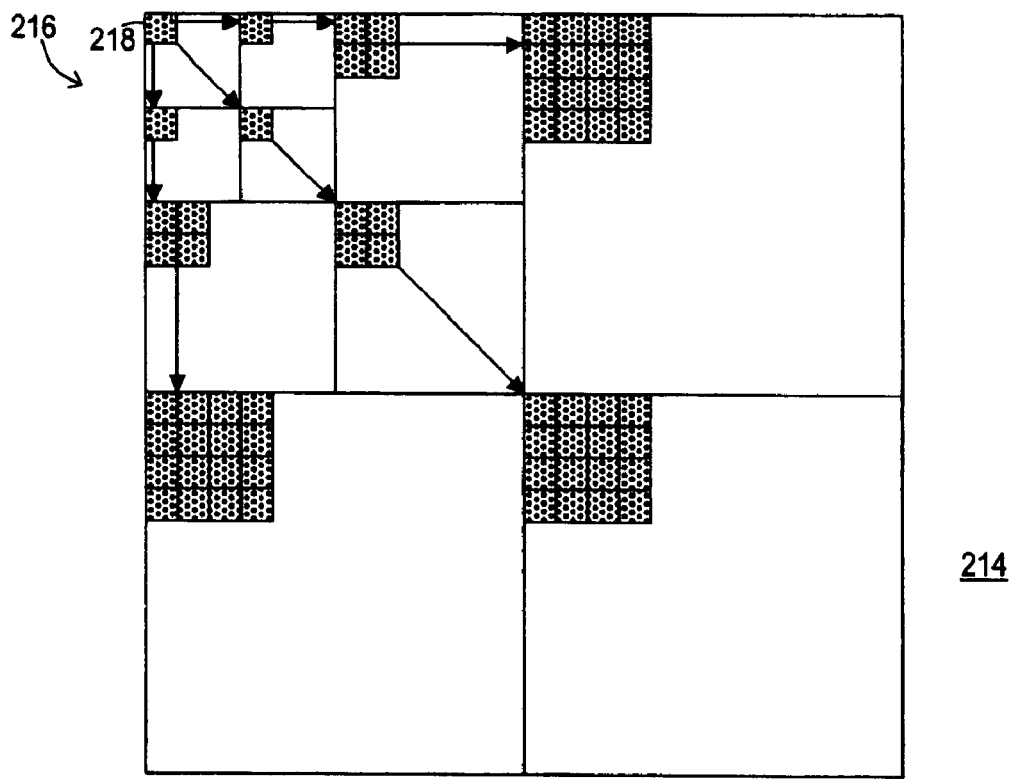
FIG. 12 shows a graphic representation of a quadtree structure formed through the execution of the encoding process of FIG. 7.

Referring to FIG. 12 in connection with task 174, FIG. 12 shows a graphic representation of a quadtree structure 214 formed through the execution of task 174 of encoding process 150. Quadtree structure 214 illustrates one of quadtrees 216. Each of quadtrees 216 includes a group of wavelet coefficients 212 (FIG. 11) which are associated with the same spatial location in error frame 204 (FIG. 10) at different frequencies. The root of each of quadtrees 216 is a group 218 of four pixels (2 pixels in height and 2 pixels in width) from the lowest frequency subband $LL_3$.

Figure 13:
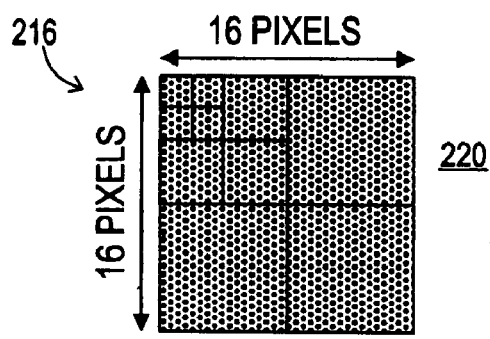
FIG. 13 shows a graphic representation of a coding block of the quadtree structure of FIG. 12.

With reference back to FIG. 7, following task 174, task 176 forms each quadtree 216 into a coding block. Referring to FIG. 13 in connection with task 176, FIG. 13 shows a graphic representation of a coding block 220 of one of quadtrees 216. In a preferred embodiment, at task 176 each quadtree 216 is formed into a 16 pixel by 16 pixel coding block 220.

Again referring back to FIG. 7, following task 176, task 178 separately codes each of coding blocks 220. Each of coding blocks 220 (FIG. 13) of quadtrees 216 (FIG. 12) is separately coded to allow for error resilience in the case of packet or channel loss (discussed below).

In an exemplary embodiment, an embedded zerotree wavelet coding algorithm is used to code each coding block 220. In this embedded zerotree wavelet coding algorithm, a pyramid structure is created for each coding block 220 with the actual 16×16 coding block of wavelet coefficients 212 (FIG. 11) at the base of the pyramid and with successively smaller layers of the pyramid representing the maximum bitplane (i.e., the memory which holds a complete one-bit-per-pixel image) of the nodes in the level below.

This structure may be represented, in the embedded zerotree wavelet coding algorithm, by maintaining the following three lists:

1. List of Insignificant Pixels (LIP) which contains wavelet coefficients 212 which have not yet become significant when compared to a threshold in a previous coding pass.

2. List of Significant Pixels (LSP) which contains wavelet coefficients 212 which have become significant when compared to a threshold in a previous coding pass.

3. List of Insignificant Bands (LIB) which contains the subbands composed of waveform coefficients 212 which have not yet become significant when compared to a threshold in a previous coding pass.

The steps of the embedded zerotree wavelet coding algorithm are as follows:

1. Initialize the Quadtree Coding:
Find the bitplane of the maximum wavelet coefficient in the coding block 220: $BP_{max} = [\log_2(\max_{(x,y)} |c_{(x,y)}|)]$.
Set the initial bitplane value to $BP = BP_{max} - 1$
Set the initial threshold $Th = 2^{BP}$.
Add the root of the quadtree 216 or pyramid to LIP.

2. Sorting Pass:
2.1) for each entry in the LIP list,
if $(|c_{(x,y)}| \geq Th)$, output 1 to the bitstream, add point to LSP list, output sign of $c_{(x,y)}$.
else, output 0 to the bitstream
2.2) for each entry in the LIB list,
if the maximum coefficient value in this subband is greater than the threshold max $|c_{(x,y)}| \geq Th$, output a 1 to the bistream, remove the entry from the LIB;
if the subband size is greater or equal to two pixels in the x and y directions, split along the x and y directions and insert the four entries into the LIB,
else, if the subband size is greater or equal to two pixels in only the x direction, split along the x direction and insert the two entries into the LIB,
else if the subband size is greater or equal to two pixels in only the y direction, split along the y direction and insert the two entries into the LIB;
else for each coefficient $c_{(x,y)}$ in the LIB list,
if $(|c_{(x,y)}| \geq Th)$, output 1 to the bistream, add point to LSP list, output sign of $c_{(x,y)}$;
else output 0 to the bitstream, add coefficient to the LIP list;
else if the maximum coefficient value is not greater than the threshold, output a 0 to the bistream.

3. Refinement Pass:
For each entry in the LSP which was added in a previous sorting pass, output the next significant bit of $|c_{(x,y)}|$.

4. Threshold Update:
Decrement bitplane value by 1, $BP = BP - 1$.
if $(BP \geq 0)$, set new threshold to $Th = 2^{BP}$, and repeat from step 2;
else stop.

Figure 14:
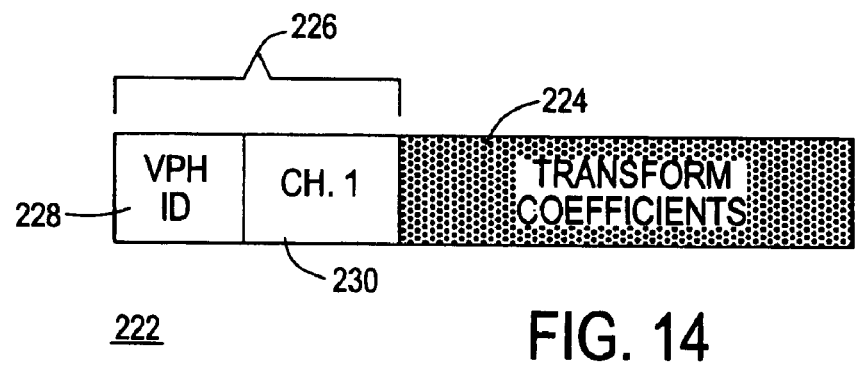
FIG. 14 shows a graphic representation of an exemplary transform coefficients packet 222 of transform coefficients formed through the execution of the encoding process of FIG. 7.

Following coding task 178, encoding process 150 continues with task 180. At task 180, output interface 132 (FIG. 6) of encoder section packetizes the coded quadtrees for transmission via wireless communication network 20. Referring to FIG. 14 in connection with task 180, FIG. 14 shows a graphic representation of an exemplary transform coefficients packet 222 of transform, i.e., wavelet, coefficients 212 (FIG. 11) in the form of a coded quadtree block 224 packetized through the execution of task 180 of encoding process 150.

Tasks 182 and 184 are performed in combination with task 180. At task 182, a header 226 is appended to transform coefficient packet 222. Header 226 includes a video packet identifier (VPH ID) 228 which indicates that that this packet is a video packet associated with one of video frames 116 (FIG. 6). In addition, task 184 assigns transform coefficient packet 222 to one of wireless channels 46 (FIG. 6) for transmission. Task 184 then appends a channel identifier 230 to transform coefficient packet 222 that indicates the one of channels 46 that should transmit transform coefficient packet 222. Of course, those skilled in the art will recognize that information pertinent to the transmission of transform coefficient packet 222 may also be included within header 226. Such information includes, for example, source and destination identifiers, error-checking code, and so forth.

Figure 15:
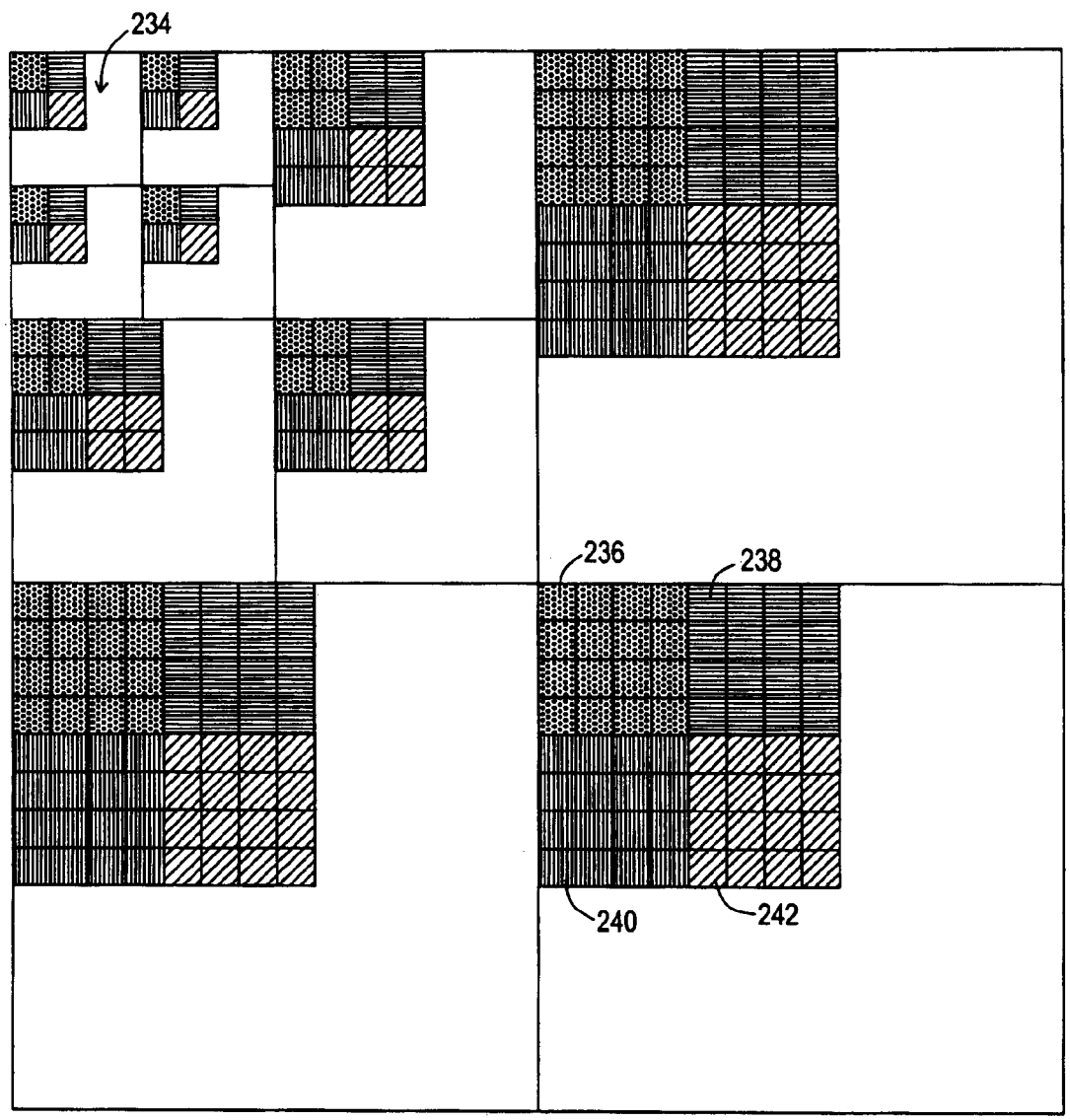
FIG. 15 shows a graphic representation of a distribution pattern of four different quadtree coefficient structures assigned for transmission over each of four wireless channels.
Figure 16:
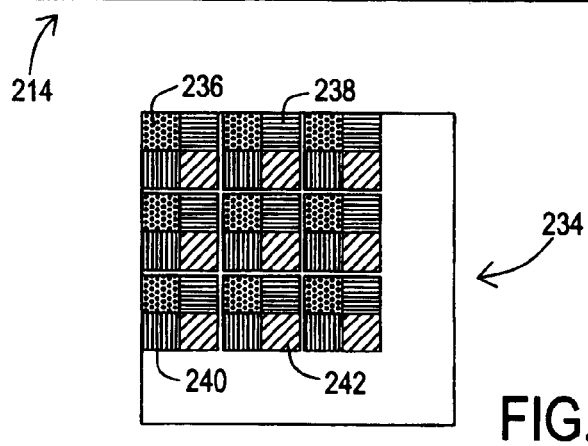
FIG. 16 shows a graphic representation of an enlarged view of a lowest frequency subband of the quadtree coefficient groups of FIG. 15.

Referring to FIGS. 15-16 in connection with task 184, FIG. 15 shows a graphic representation of a distribution pattern of four different quadtree structures 214 assigned for transmission over each of four wireless channels 46 (FIG. 6). FIG. 16 shows a graphic representation of an enlarged view of a lowest frequency subband 234 of quadtree structures 214 of FIG. 15. Task 184 advantageously distributes multiple transform coefficient packets 222 among multiple wireless channels 46 for transmission.

FIG. 15 particularly illustrates a scenario in which the independent quadtree structures 214 have not yet been separately grouped into coding blocks 220 (FIG. 13) to clearly emphasize the distribution of wavelet coefficients 212 (FIG. 10) in quadtree structures 214. To this end, a first pattern 236 indicates one of quadtree structures 214 assigned to a first one of wireless channels 46, i.e., a first wireless channel 46A (FIG. 6). Similarly, a second pattern 238 indicates a second quadtree structure 214 assigned to a second one of wireless channels 46, i.e., a second wireless channel 46B. A third pattern 240 indicates a second quadtree structure 214 assigned to a third one of wireless channels 46, i.e., a third wireless channel 46C, and a fourth pattern 242 indicates a fourth quadtree structure 214 assigned to a fourth one of wireless channels 46, i.e., a fourth wireless channel 46D.

The configuration of quadtree structures 214, the separate coding of quadtree structures 214 into coding blocks 220, and distributed assignment of transform coefficient packets 222 containing coded quadtree block 224 (FIG. 14) to wireless channels 46 at task 184 advantageously ensures that contiguous portions of error frame 204 (FIG. 10), representative of the frame data, such as, video frame 116 (FIG. 6), will be transmitted over different channels 46. This facilitates estimation of wavelet coefficients 212 lost or corrupted in transmission during a decoding process (discussed below).

Referring back to FIG. 6-7, following task 184, task 186 of encoding process 150 forwards transform coefficient packets 222 as video packets 135 toward IMUX 92 via data I/O port 86.

Following task 186, process control proceeds to a query task 232. At task 232, video encoder/decoder system 114 (FIG. 6) determines whether there is another one of successive video frames 116 that is to be encoded. When there is another of video frames 116, process control loops back to task 152 to receive another video frame 116. However, when there are no further video frames 116, encoding process exits.

As mentioned above, tasks 172, 174, 176, 178, 180, 182, 184, 186 describe a series of operations that are performed to encode frame data in response to either of tasks 170 and 171. As further mentioned above, tasks 188, 190, 192, 194, 196, and 198 of encoding process 150 describe a series of operations that are performed to encode motion vectors 166 in response to only task 170. Accordingly, the following description now pertains to tasks 188, 190, 192, 194, 196, and 198.

In response to task 170, task 188 is initiated to split motion vectors 166 (FIG. 9) into coding blocks. That is, motion vector splitter 134 (FIG. 6) splits motion vectors 166 corresponding to video frame 116 (FIG. 6) into, for example, 16 by 16 coding blocks.

Following task 188, task 190 separately codes blocks of motion vectors 166. In an exemplary embodiment, second coder 136 (FIG. 6) employs Huffman coding to execute task 190. Huffman coding is an entropy encoding algorithm used for data compression. In Huffman coding, text to be compressed, i.e., motion vectors 166, is considered as a string of symbols. Symbols that are likely to be frequent are represented by short sequences of bits, and symbols that are likely to be rare are represented by long sequences of bits. The blocks of motion vectors are separately coded to allow for error resilience in the case of packet or channel loss (discussed below). Although Huffman coding is preferred, alternative coding techniques may be contemplated.

Figure 17:
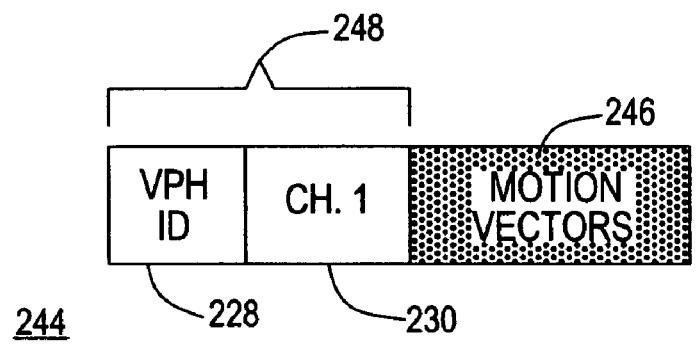
FIG. 17 shows a graphic representation of an exemplary motion vector packet of motion vectors formed through the execution of the encoding process of FIG. 7.

Following coding task 190, encoding process 150 continues with task 192. At task 192, output interface 132 (FIG. 6) of encoder section 118 packetizes the Huffman coded motion vectors for transmission via wireless communication network 20. Referring to FIG. 17 in connection with task 192, FIG. 17 shows a graphic representation of an exemplary motion vector packet 244 of motion vectors 166 (FIG. 9) in the form of a coded motion vectors 246 packetized through the execution of task 192.

Tasks 194 and 196 are performed in combination with task 192. At task 194, a header 248 is appended to motion vector packet 244. Header 248 includes packet identifier (VPH ID) 228 which indicates that that this packet is a video packet associated with one of video frames 116 (FIG. 6). In addition, task 196 assigns motion vector packet 244 to one of wireless channels 46 (FIG. 6) for transmission. Task 196 then appends channel identifier 230 to motion vector packet 244 that indicates the one of channels 46 that should transmit motion vector packet 244. Of course, those skilled in the art will recognize that information pertinent to the transmission of motion vector packet 244 may also be included within header 248. Such information includes, for example, source and destination identifiers, error-checking code, and so forth.

Figure 18:
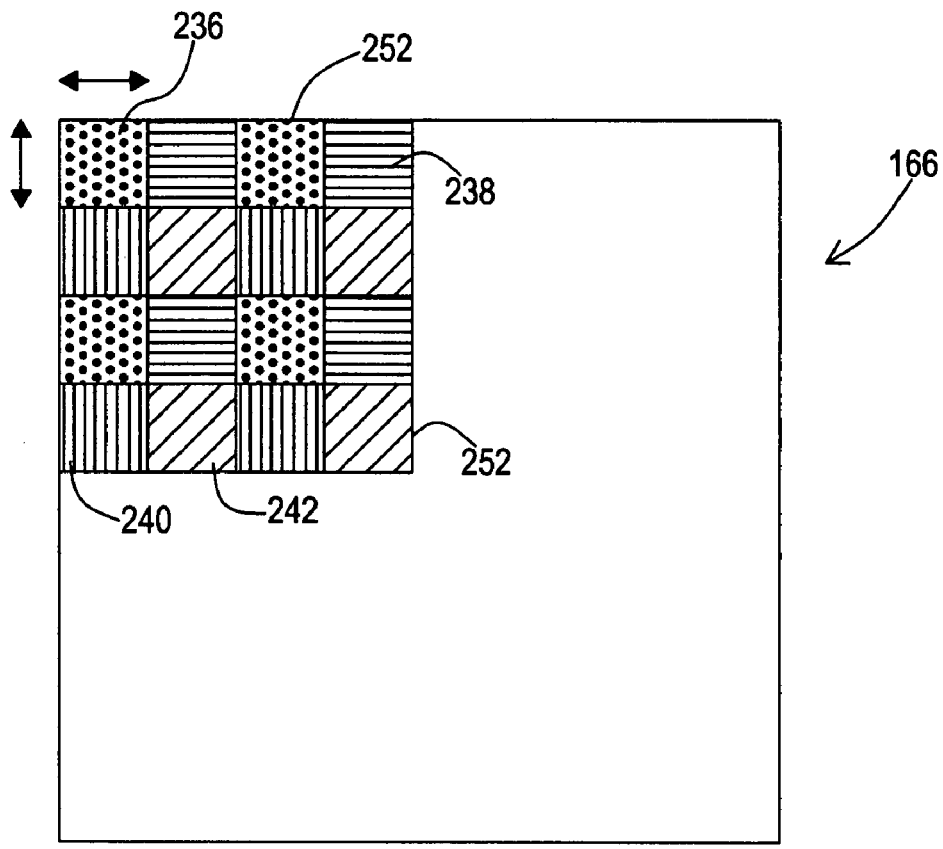
FIG. 18 shows a graphic representation of a distribution pattern of blocks of coded motion vectors assigned for transmission over each of four wireless channels.

Referring to FIG. 18 in connection with task 196, FIG. 18 shows a graphic representation of a distribution pattern of blocks 252 of Huffman coded motion vectors 246 (FIG. 17), assigned for transmission over each of four wireless channels 46 (FIG. 6). Task 196 advantageously distributes multiple motion vector packets 244 among multiple wireless channels 46 for transmission so that adjacent motion vectors 166 (FIG. 9), representing video frame 116, will be transmitted over different ones of wireless channels 46.

FIG. 18 particularly illustrates the distribution of a number blocks 252 of Huffman coded motion vectors 246 assigned for transmission via wireless channels 46. To that end, first pattern 236 indicates ones of motion vector blocks 252 assigned to first wireless channel 46A (FIG. 6). Similarly, second pattern 238 indicates ones of motion vector blocks 252 assigned to second wireless channel 46B. Third pattern 240 indicates ones of motion vector blocks 252 assigned to third wireless channel 46C, and fourth pattern 242 indicates ones of motion vector blocks 252 assigned to fourth wireless channel 46D.

The splitting of motion vectors 166 into blocks, the separate coding of the split blocks of motion vectors into coded motion vector blocks 252, and distributed assignment of motion vector packets 244 containing blocks 252 of coded motion vector blocks 246 to wireless channels 46 at task 196 advantageously ensures that adjacent portions of motion vectors 166 (FIG. 9) will be transmitted over different channels 46. This distribution of motion vectors 166 facilitates estimation of motion vectors 166 lost or corrupted in transmission during a decoding process (discussed below).

Referring back to FIGS. 6-7, following task 196, task 198 of encoding process 150 forwards motion vector packets 244 as ones of video packets 135 toward IMUX 92 via data I/O port 86. The concurrent, but independent, encoding operations enable coded quadtree coefficient groups, i.e., in the form of coded blocks 224 (FIG. 14) and blocks 252 (FIG. 18) of coded motion vectors 246, to be distributed among wireless channels 46 independent from one another.

Following task 198, and in cooperation with task 186, process control proceeds to query task 232 to determine whether there is another one of successive video frames 116 that is to be encoded. When there is another of video frames 116, process control loops back to task 152 to receive another video frame 116. However, when there are no further video frames 116, encoding process exits.

Transmit Process

Figure 19:
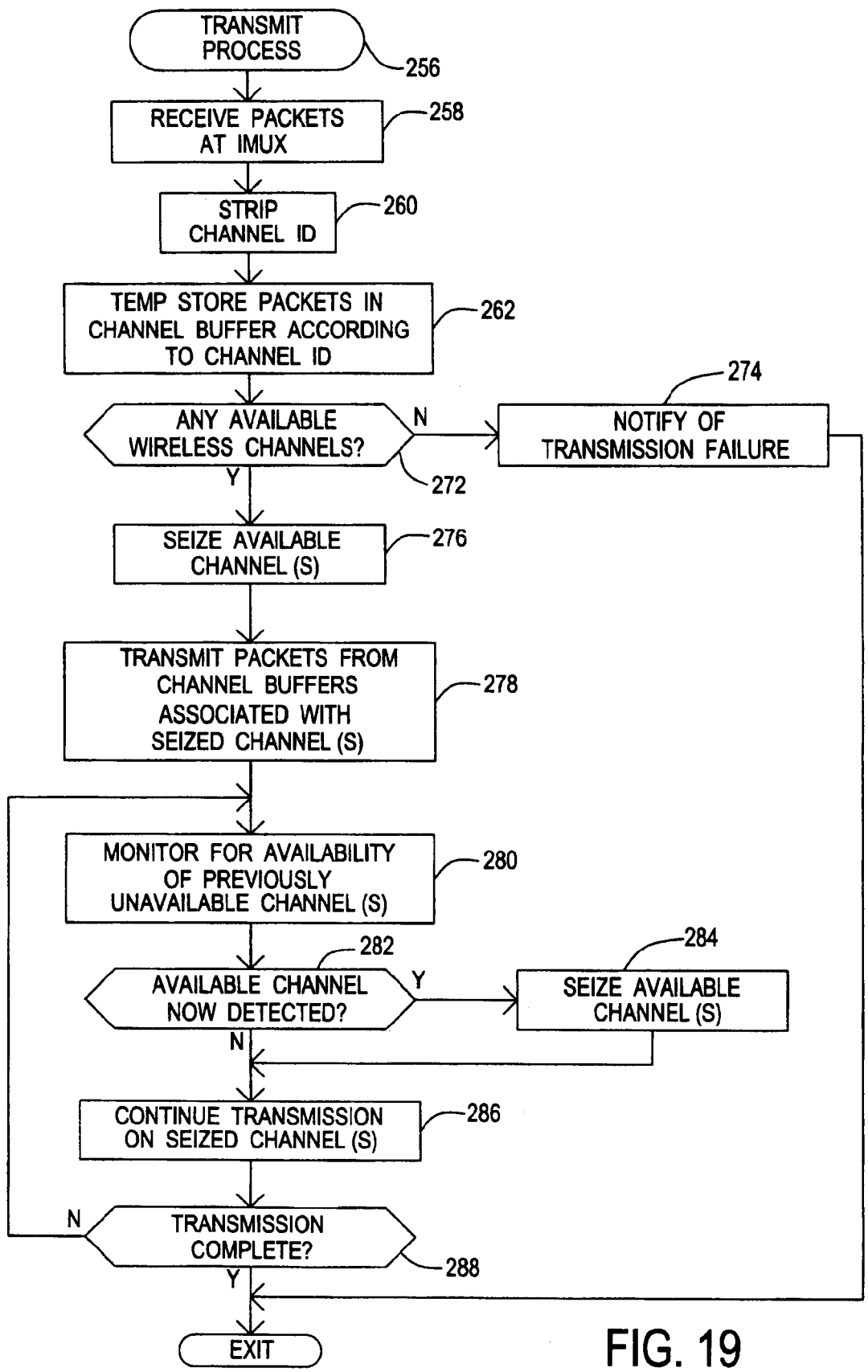
FIG. 19 shows a flow chart of a transmit process performed by the IMUX system of FIG. 5.
Figure 20:
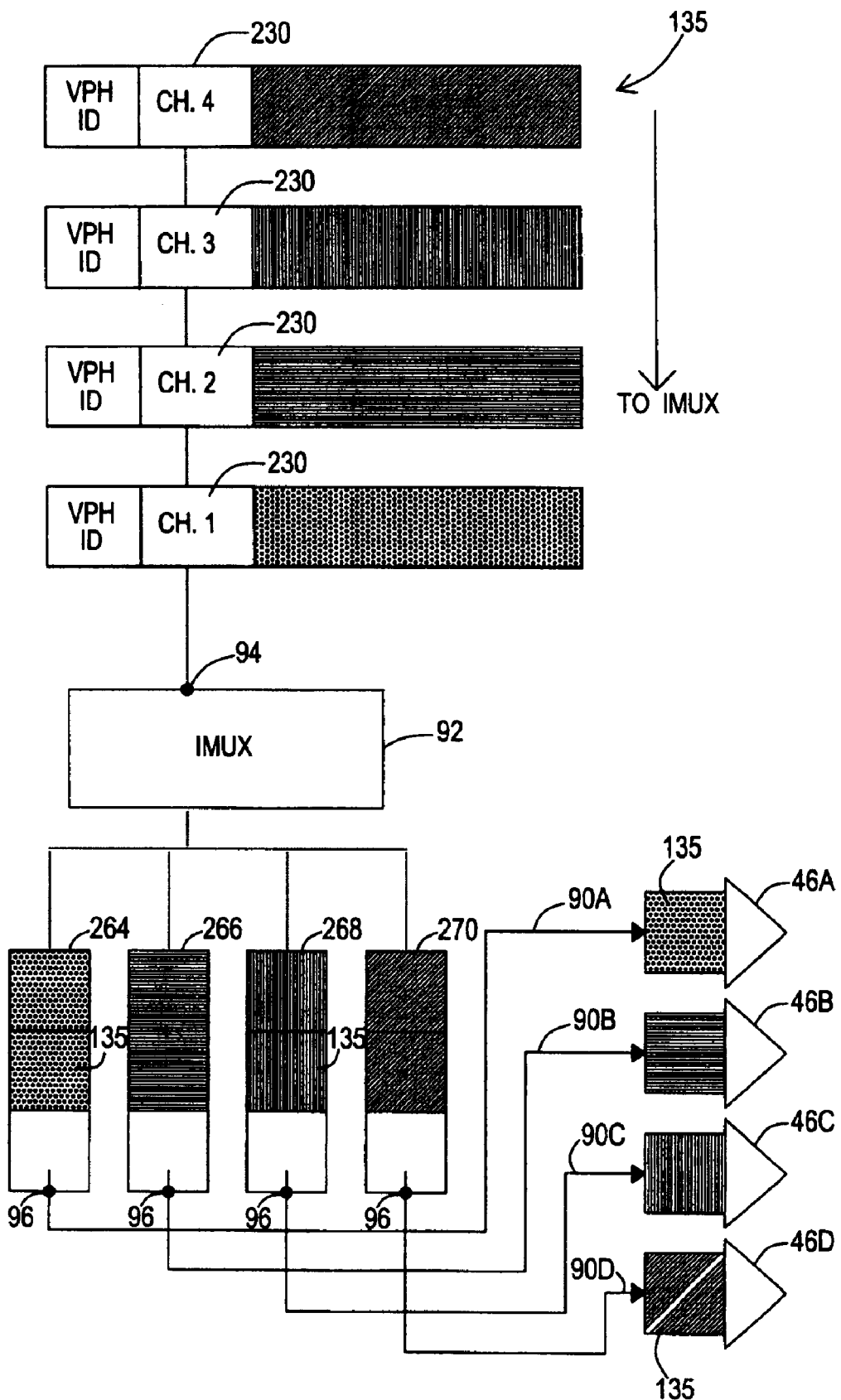
FIG. 20 shows a block diagram of transmission of video packets resulting from the execution of the transmit process of FIG. 19.

Referring to FIGS. 19-20, FIG. 19 shows a flow chart of a transmit process 256 performed by IMUX systems 64 (FIG. 5), and FIG. 20 shows a block diagram of transmission resulting from the execution of transmit process 256. In response to encoding process 150 detailed above, output interface 132 (FIG. 6) of video encoder/decoder system 114 (FIG. 6) forwards video packets 135 toward IMUX system 64A for receipt at IMUX input 94. As discussed in connection with encoding process 150, video packets 135 may be either of transform coefficient packets 222 (FIG. 14) and motion vector packets 244 (FIG. 17).

Transmit process 256 begins at a task 258. At task 258 video packets 135 are received at IMUX 92. Video packets 135 may be forwarded from output interface (FIG. 6) in a sequence, as shown in FIG. 20, and are received serially at IMUX 92.

In response to task 258, tasks 260 and 262 are performed in response to task 258. Task 260 causes IMUX 92 to strip channel identifier 230 from video packets 135 as they are received. In addition, at task 262, IMUX 92 temporarily stores video packets 135 in channel buffers, or lists, in accordance with channel identifier 230. For example, the channel buffers include a first list 264 associated with first channel 46A, a second list 266 associated with second channel 46B, a third list 268 associated with third channel 46C, and a fourth list 268 associated with fourth channel 46D.

In response to the presence of video packets 135 at the channel buffers, transmit process 256 continues with a query task 272. First IMUX system 64A (FIG. 5) is configured to monitor for wireless channel acquisition signaling pertaining to the desired transmission of data signal 88 (FIG. 5), video signal 90 (FIG. 5), or voice signal 104 (FIG. 5). Wireless channel acquisition signaling may be, for example, a conventional set-up message for originating wireless communication. When video packets 135 are detected, query task 272 determines whether there are any of wireless channels 46 available for the transmission of video packets 135.

When query task 272 determines that there are no wireless channels 46 available for the transmission of video packets 135 as subsectional signals 90A, 90B, 90C, and 90D, transmit process 256 proceeds to a task 274. Task 274 provides notification of a transmission failure. Notification may be in the form of a text message at first user/net terminal 72 (FIG. 4), lighting or sound indication on first IMUX system 64A, and so forth. Following task 274, transmit process 256 exits.

Returning to query task 272, when query task 272 determines that there is at least one available wireless channel 46, transmit process 256 proceeds to a task 276. At task 276, the available wireless channels 46 are seized, through known channel acquisition processes, for transmission of video packets 135 as subsectional signals 90A, 90B, 90C, and 90D.

In response to task 276, a task 278 causes first IMUX system 64A (FIG. 4) to transmit video packets 135 from first, second, third, and fourth lists 264, 266, 268, and 270 associated with each of the available ones of first, second, third, and fourth traffic channels 46A, 46B, 46C, and 46D, respectively. As each of video packets 135 is transmitted via associated ones of wireless traffic channels 46, the next video packet 135 from first, second, third, and fourth lists 264, 266, 268, and 270 is sent to LBTs 108 (FIG. 5).

A task 280 is performed in connection with transmit task 278. Task 280 monitors for the release and subsequent availability of a previously unavailable one or more of channels 46. In addition, a query task 282 performed in concurrence with task 280 determines whether an available wireless channel 46 is now detected. By way of example, first channel 46A may have been in use for the transmission of voice signal 104 (FIG. 5). Upon completion of the call, first channel 46A is released per conventional channel release signaling. Task 280 monitors for the channel release signaling.

When query task 282 determines that an available channel, for example, the exemplary first channel 46A, has become available transmit process 256 proceeds to a task 284 to seize the now available one of wireless channels 46. Following task 284, transmit process 256 proceeds to a task 286 to continue the transmission of video packets 135 from first, second, third, and fourth lists 264, 266, 268, and 270 associated with the seized ones of wireless channels 46, including the one of wireless channels 46 seized at task 284. When query task 282 determines that any previously unavailable channels 46 remain unavailable, transmit process 256 also proceeds to task 286 to continue the transmission of video packets 135 from first, second, third, and fourth lists 264, 266, 268, and 270 associated with the seized ones of wireless channels 46.

In response to task 286, a query task 288 determines whether transmission is complete. When transmission of video packets 135 is not complete, transmit process 256 loops back to task 280 to monitor for the availability of wireless channels and to continue transmission of video packets 135. However, when transmission of video packets 135 is complete, transmit process 256 exits following conventional channel release mechanisms.

Receive Process

Figure 21:
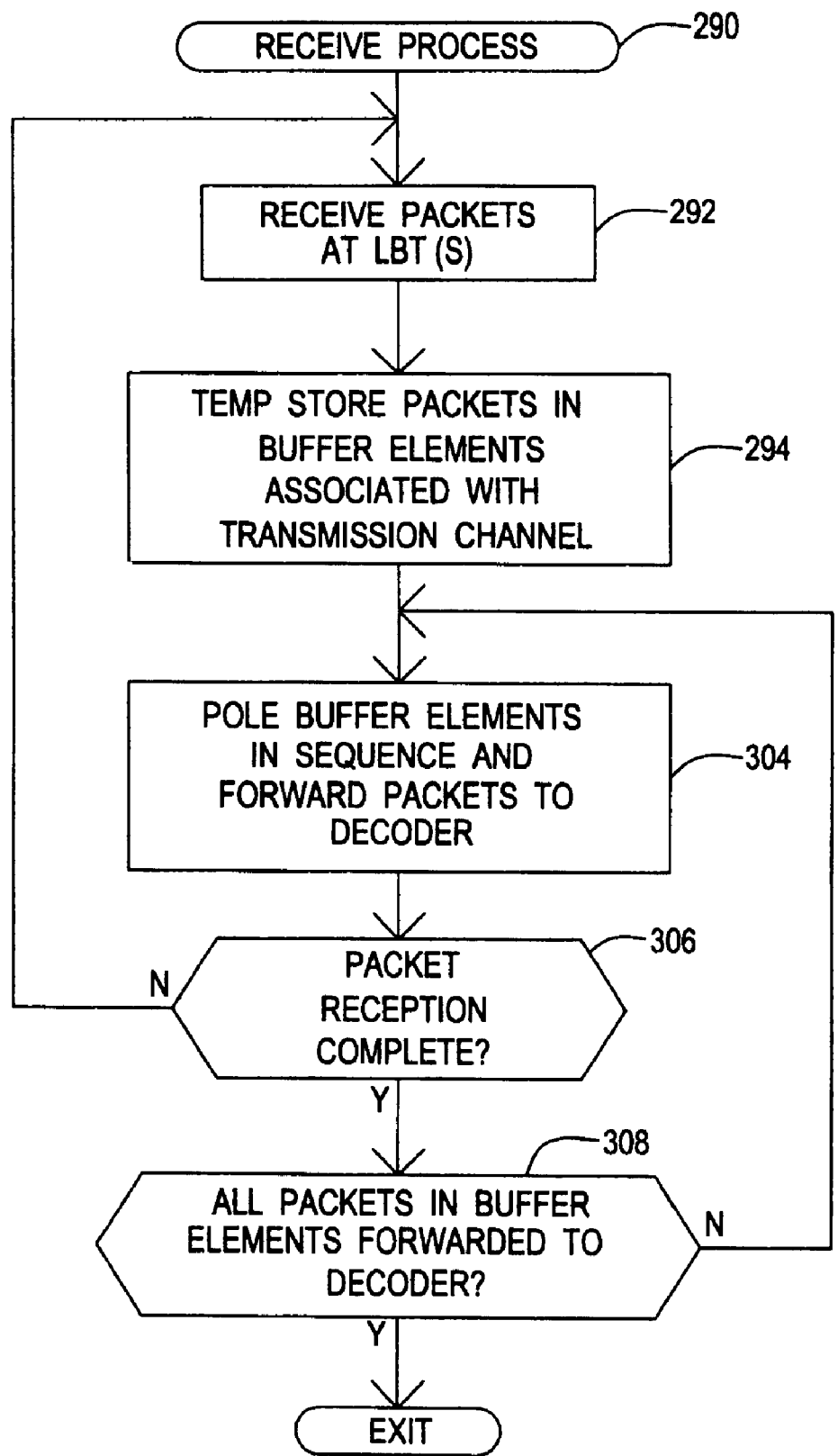
FIG. 21 shows a flow chart of a receive process performed by the IMUX system of FIG. 5.
Figure 22:
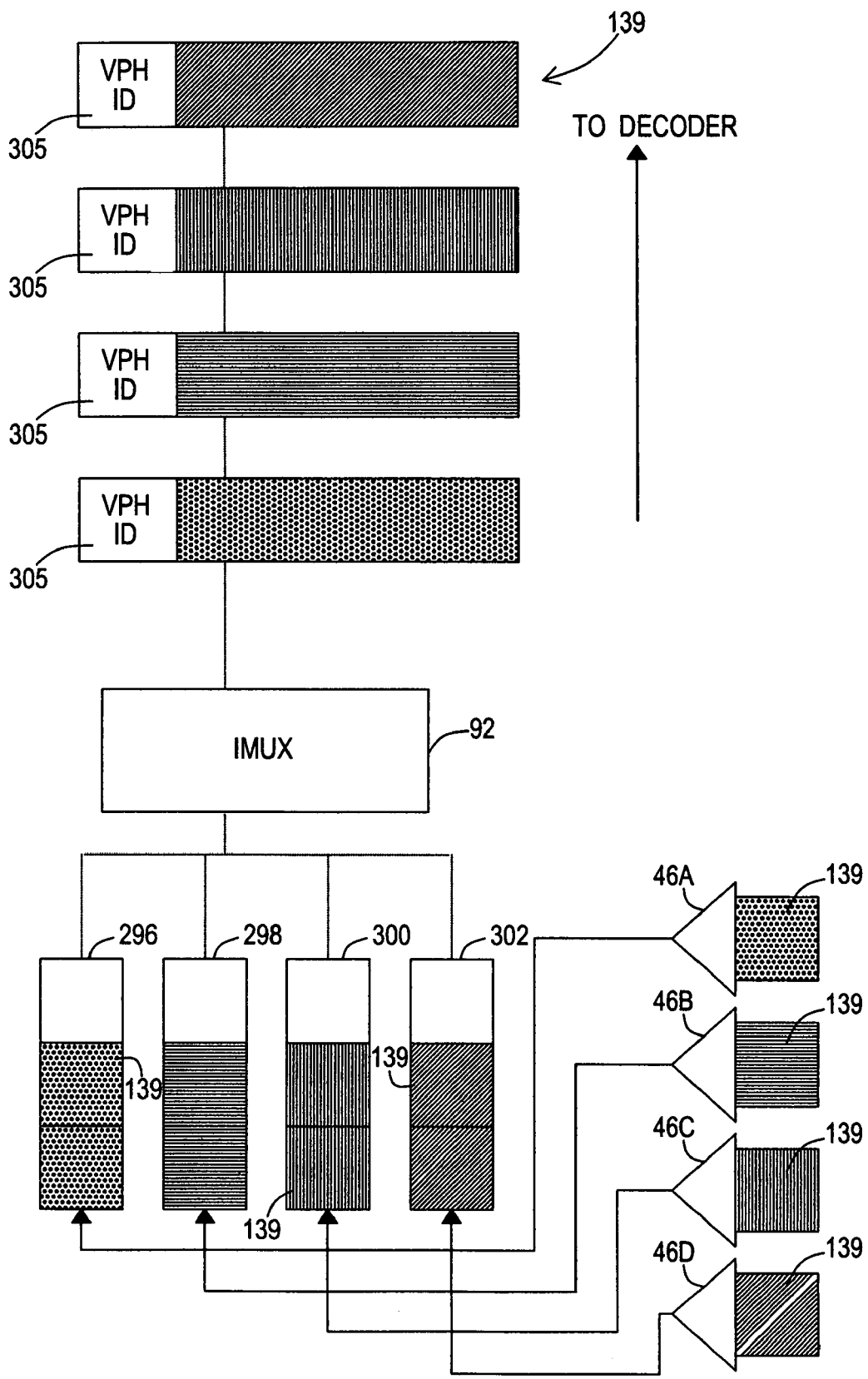
FIG. 22 shows a block diagram of reception of video packets resulting from the execution of the receive process of FIG. 21.

Referring to FIGS. 21-22, FIG. 21 shows a flow chart of a receive process 290 performed by one of IMUX systems 64. For illustrative purposes, first IMUX system 64A (FIG. 5) is now configured to receive video packets 139 (FIG. 6) from, for example, second IMUX system 64B (FIG. 4). FIG. 22 shows a block diagram of reception of video packets 139 resulting from the execution of receive process 290. Video packets 139 may be either of transform coefficient packets 222 (FIG. 14) and motion vector packets 244 (FIG. 17) generated at a second video coder/decoder system 114 associated with second IMUX system 64B.

In general, transmit process 256 (FIG. 19) parses the video data appropriately and sends different portions of the data over separate wireless channels 46. Receive process 290 subsequently recombines the original data, using buffers to compensate for variations in transmission delay of each of wireless channels 46.

Receive process 290 generally begins with a task 292. At task 292, video packets 139 are received at LBTs 108 (FIG. 5) associated with traffic channels 46.

In response to task 292, a task 294 causes the received video packets 139 to be temporarily stored in channel buffers in accordance with the one of wireless channels over which the received video packets 139 were transmitted. For example, the channel buffers include a first buffer element 296 maintained by IMUX 92 into which video packets 139 received via first channel 46A are stored. Similarly, the channels buffers maintained by IMUX 92 include a second buffer element 298 into which video packets 139 received via second channel 46B are stored, a third buffer element 300 into which video packets 139 received via third channel 46C are stored, and a fourth buffer element 302 into which video packets 139 received via fourth channel 46B are stored. Of course, it should be understood that video packets 139 need not be received at each of first, second, third, and fourth channels 46A, 46B, 46C, and 46 concurrently. Rather, video packets 139 may only be received via those wireless channels 46 that were successfully seized when video transmission activities were commenced or were successfully seized when one of the previously unavailable wireless channels 46 was later seized.

As video packets 139 are stored in respective ones of first, second, third, and fourth buffer elements 296, 298, 300, and 302, a task 304 poles buffer elements 296, 298, 300, and 302 in sequence. If there is one of video packets 139 in the poled one of buffer elements 296, 298, 300, and 302, IMUX 92 appends a video packet identifier 305 to the video packet 222 to indicate that it is a video packet associated with a particular received video frame 144. In addition, IMUX 92 forwards video packet 139 to decoder section 120 (FIG. 6) of video encoding/decoding system 114 (FIG. 6).

Next, a query task 306 determines whether reception of video packets 139 is complete. That is, query task 306 determines whether there are any more of video packets 139 being received at LBTs 108 (FIG. 5). When packet reception is not complete, receive process 290 loops back to task 292 to continue receiving and storing video packets 139. However, when packet reception is complete, as indicated by conventional channel release mechanisms, receive process 290 proceeds to a query task 308.

Query task 308 then determines whether all video packets 139 stored in first, second, third, and fourth buffer elements 296, 298, 300, 302 have been forwarded to decoder section 120. When forwarding of video packets 139 is incomplete, receive process 290 loops back to task 304 to continue forwarding video packets 139 to decoder section 120. However, when packet forwarding is complete, receive process 290 exits.

Decoding Process

Figure 23:
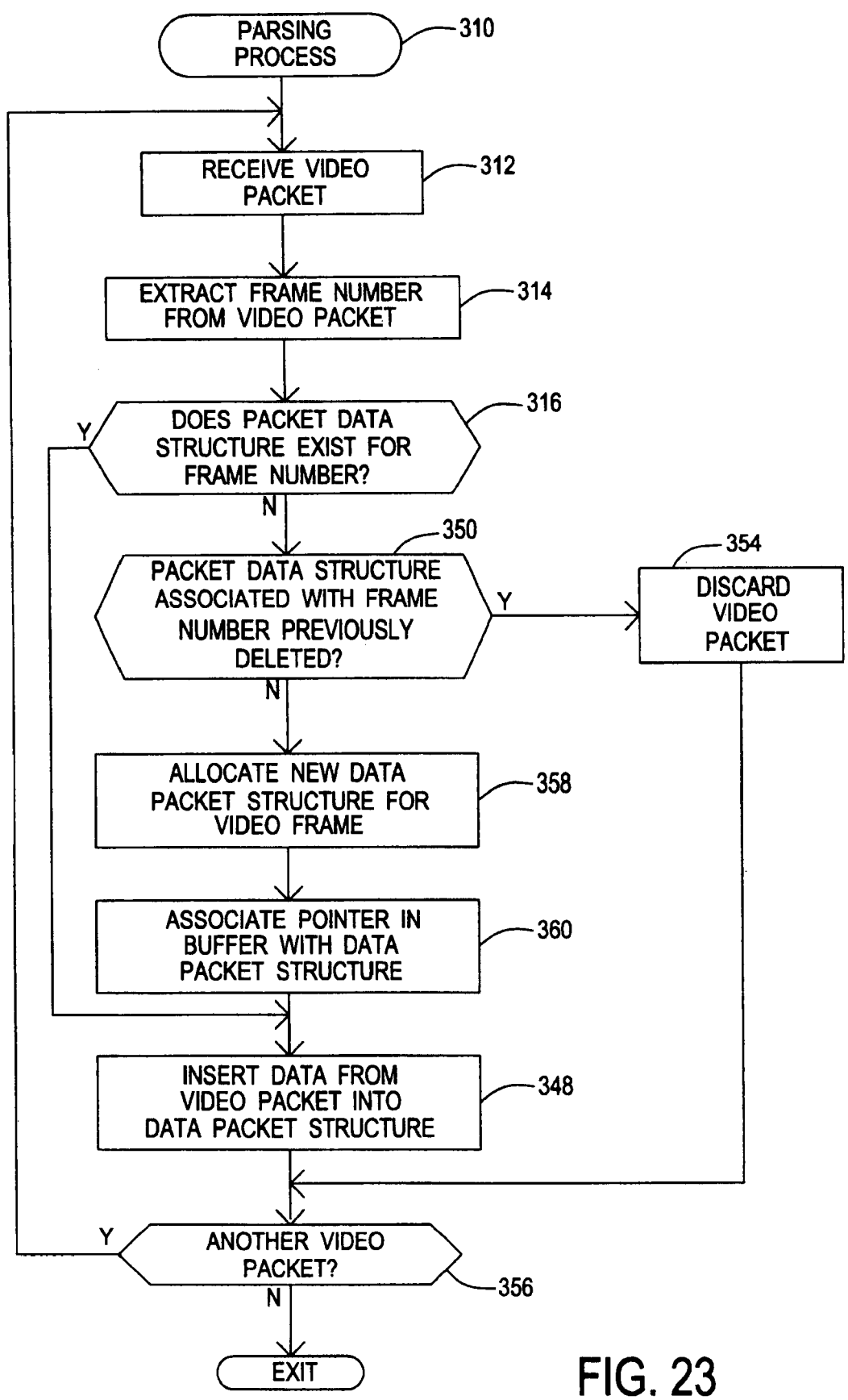
FIG. 23 shows a flow chart of a parsing process performed by the video encoder/decoder system of FIG. 6.

FIG. 23 shows a flow chart of a parsing process 310 performed by decoding section 120 (FIG. 6) of video encoder/decoder system 114 (FIG. 6). In general, the decoding process parses the data representative of successive received video frames 144 (FIG. 6) into received frames buffer 140 (FIG. 6) of a receiving decoding section 120 of a receiving video encoding/decoding system 114, and subsequently decodes the received data to reconstruct received video frame 144. Consequently, received video frames 144 are a reconstruction of transmitted video frames 116 from another of IMUX systems 64.

Parsing process 310 begins with a task 312. At task 312, video packets 139 forwarded from IMUX 92 are received at input interface/data parser 138 of decoder section 120 (FIG. 6).

In response to task 312, a task 314 is executed. At task 314, input interface 138 extracts a frame number from a received one of video packets 139.

Figure 24:
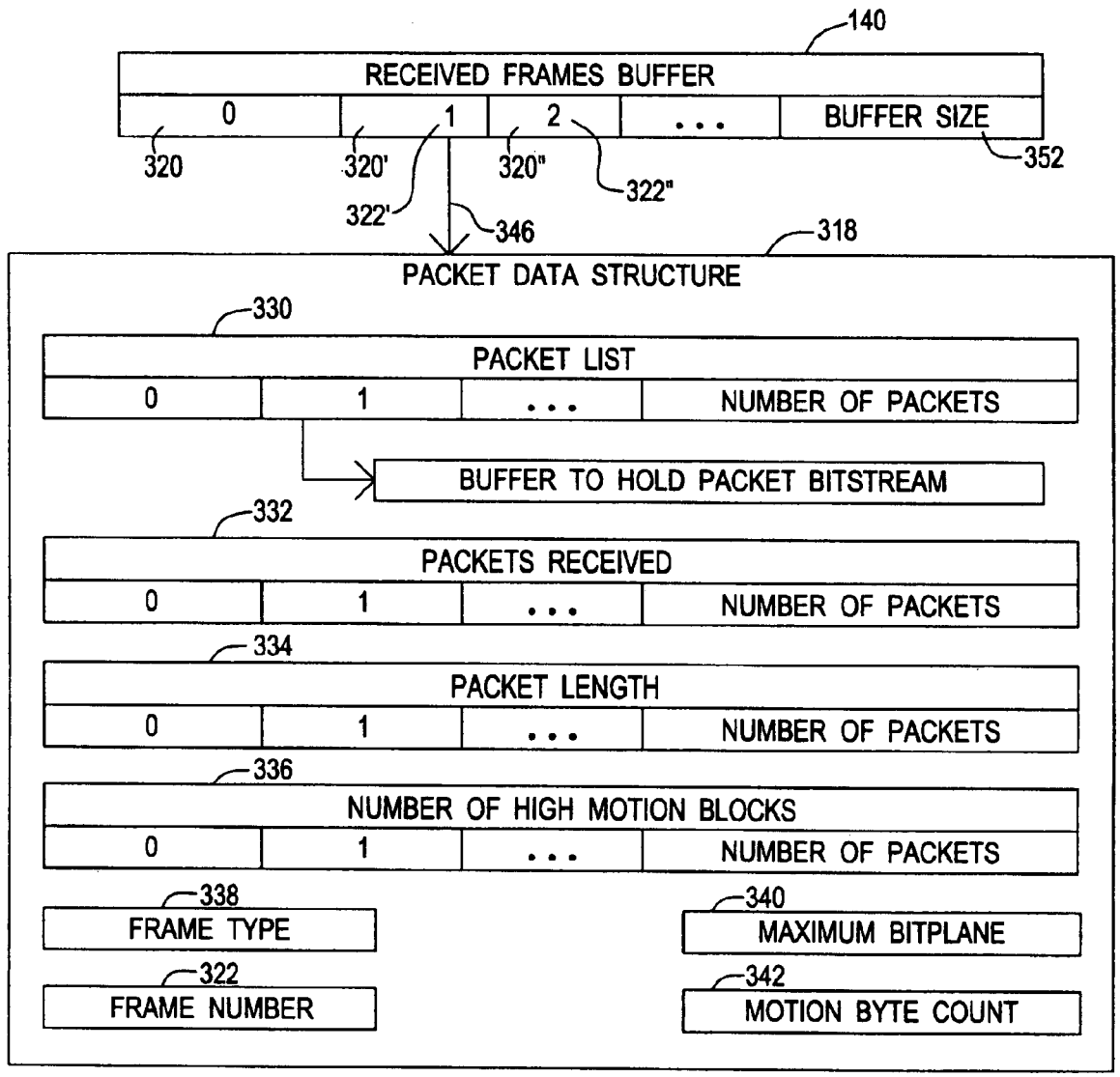
FIG. 24 shows a block diagram of a received frames buffer and packet data structure established through the execution of the parsing process of FIG. 23.

Next, a query task 316 is performed by input interface 138 to determine whether a packet data structure exists for the extracted frame number. Referring to FIG. 24 in connection with query task 316, FIG. 24 shows a block diagram of received frames buffer 140 and a packet data structure 318 established through the execution of parsing process 310.

Received frames buffer 140 is a circular buffer used to store a continuous stream of data by starting again at the beginning of buffer 140 after reaching an end. In a preferred embodiment, a sequence of buffer slots 320 of received frames buffer 140 is associated with a corresponding sequence of frame numbers 322 of received video frames 144 (FIG. 6). For example, a first buffer slot 320' is associated with a first frame number 322'; a second buffer slot 320" is associated with a second frame number 322"; and so forth. Separate read and write pointers (not shown) are maintained by buffer 140, and these read and write pointers are not allowed to pass each other, so that unread data will not be inadvertently overwritten or so that invalid data will not be read.

Data for each of received video frames 144 (FIG. 6) is stored in a separate one of packet data structures 318. Packet data structure 318 is generalized to hold any of the three types of video frames 116 (FIG. 6) that may be coded at another video coder/decoder system 114 (FIG. 6). These frames include intraframes, motion-compensated interframes, and non-motion-compensated interframes. In an exemplary embodiment, each packet data structure 318 contains eight variables, as follows:

1. Unsigned char* packet list[PACKET NUMBER] 330: an array of pointers to unsigned character arrays to hold the coded bitstreams of each packet.

2. Int packets received[PACKET NUMBER] 332: an array of integers to indicate which packets have been received (initialized to 0 when Packet Data Structure 318 is created, and set to 1 as each packet arrives).

3. Int packet length[PACKET NUMBER] 334: an array of integers to hold the length of the coded bitstream of each packet.

4. Int number of high motion blocks[PACKET NUMBER] 336: for packets which contain compressed wavelet coefficients of interframes, this indicates the number of high energy blocks which have been allocated extra bits in that packet.

5. Int frame type 338: integer field to indicate the type of frame which was coded (intraframe, motion-compensated interframe, or non-motion-compensated interframe).

6. Int max bitplane 340: indicates the maximum bitplane of any of the wavelet coefficients that was found when performing quadtree encoding.

7. Int motion byte count 342: when the data structure is for a motion-compensated interframe, indicates the number of bytes used to Huffman code the motion vectors.

8. Int frame number 322: indicates the frame number to which the packet belongs.

At query task 316, buffer slot 320 associated with the frame number, for example, first buffer slot 320' associated with first frame number 322', is checked to ascertain whether a pointer 346 indicates that packet data structure 318 exists for first frame number 322'. Alternatively, pointer 346 may be NULL, indicating that packet data structure 318 does not exist for first frame number 322'.

When pointer 346 indicates that packet data structure 318 exists at query task 316, parsing process 310 proceeds to a task 348. At task 348, input interface 138 (FIG. 6) parses the data from video packet 139 and inserts the data into data packet structure 318. Alternatively, when pointer 346 is NULL at query task 316, parsing process 310 proceeds to a query task 350.

Query task 350 determines whether packet data structure 318 associated with frame number 322 was previously deleted. Received frames buffer 140 is created by inserting pointers associated with packet data structures 318 into buffer 140 at position=frame number mod buffer size threshold 352, where mod is the modulo operator, and buffer size threshold 352 is a maximum number of frames that can be stored in received frames buffer 140. As received video frames 144 are decoded, their packet data structures 318 are deleted to create empty slots for packets 139 of new received video frames 144.

When query task 350 determines that packet data structure 318 has been previously deleted, process control proceeds to a task 354. At task 354, video packet 139 is simply discarded. Consequently, any packets 139 which have been delayed to such an extent that their video frame 144 has already been decoded are discarded. Following task 354, parsing process 310 proceeds to a query task 356 (discussed below). Alternatively, when query task 350 determines that packet data structure 318 has not yet been allocated, parsing process 310 proceeds to a task 358.

At task 358, a new packet data structure 318 is allocated for the particular one of received video frames 144, identified by frame number 322.

In addition, a task 360 associates pointer 346 in received frames buffer 140 with the newly allocated packet data structure 318. Following task 360 parsing process 310 proceeds to task 348 to parse the data from video packet 139 and insert the data into data packet structure 318.

Following task 348, and as mentioned above, following task 354, program control proceeds to query task 356. At query task 356, input interface 133 (FIG. 6) determines whether there is another of video packets 139 forwarded from IMUX 92 (FIG. 6). When there is another packet 139, parsing process 310 loops back to task 312 to receive video packet 139 and parse data contained within packet 139. Alternatively, when query task 356 determines that there are no further video packets 139, parsing process 310 exits.

Figure 25:
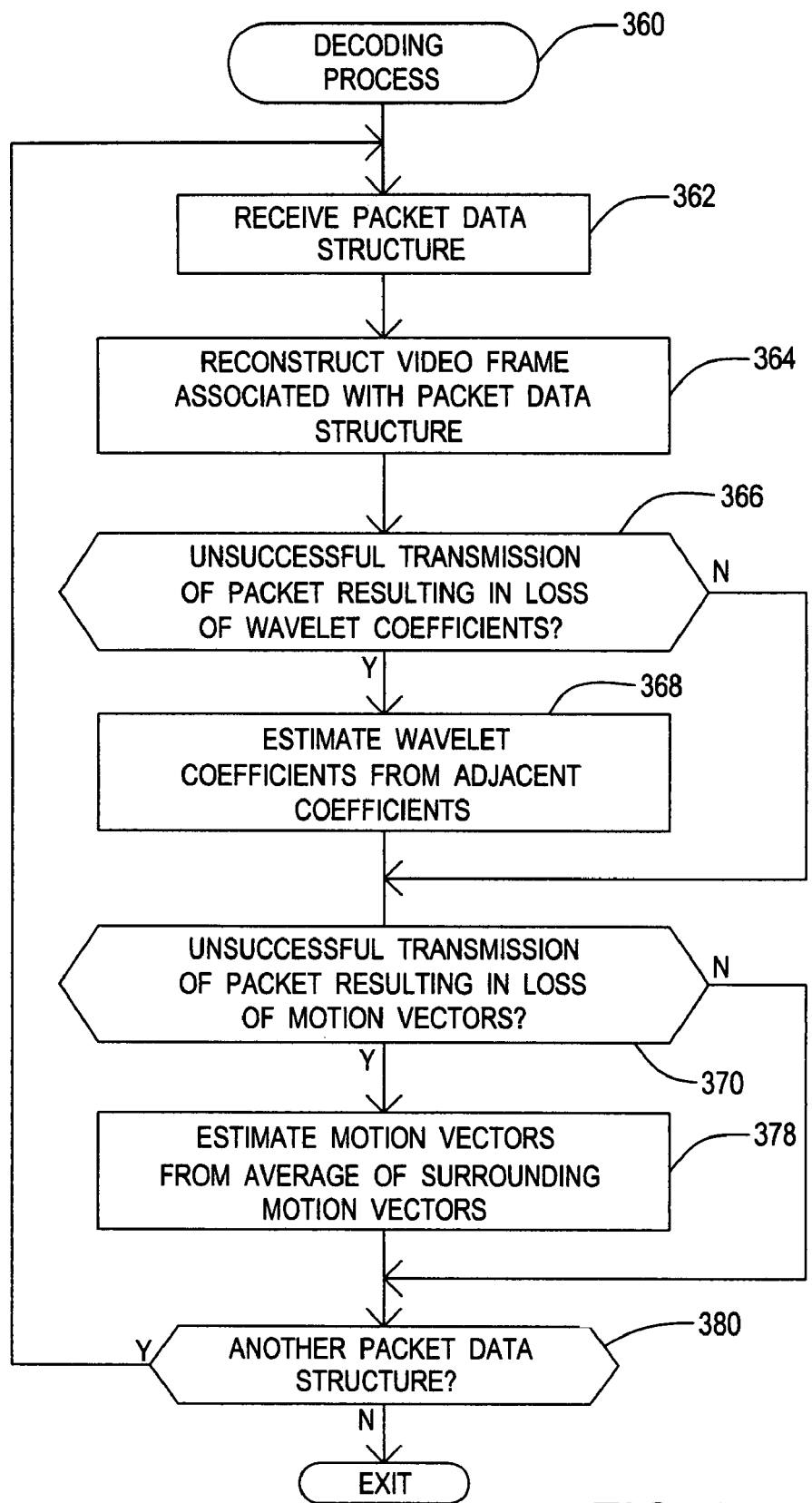
FIG. 25 shows a flow chart of a decoding process performed by the video encoder/decoder system of FIG. 6.

FIG. 25 shows a flow chart of a decoding process 360 performed by video encoder/decoder system 114 (FIG. 6). Decoding process 360 takes advantage of the multiple description encoding methodology to remove visually annoying artifacts caused by lost channels, to increase the peak signal-to-noise ratio (PSNR), and to improve the video quality.

Decoding process 360 begins with a task 362. At task 362, a packet data structure 318 (FIG. 24) is received in response to information contained in received frames buffer 140 (FIG. 24). In a preferred embodiment of the present invention, received frames buffer 140 utilizes an adaptive buffering system based on thresholds to maintain a steady decoding and video playback speed even in the event of changes in the latency of wireless channels 46. A lower bound threshold and an upper bound threshold on the number of video frames 144 represented in received frames buffer 140 are set. The lower bound threshold may desirably be set to be equal to the desired playback frame rate (in frames per second) times the maximum difference in latency between any of wireless channels 46. The upper bound threshold should be set to be equal to buffer size threshold 352 (FIG. 24) to ensure that received frames buffer 140 does not overflow.

Let the term "Buffer Level" be used to denote the current number of video frames 144 represented in received frames buffer 140. The implemented adaptive buffering scheme is thus summarized as follows:

```
                if (Buffer Level > 0 AND Buffer Level < Lower
Threshold
        Change display interval to:
            display interval = (Lower Threshold*display
                interval)/(Buffer Level);
        else if (Buffer Level > Upper Threshold)
            Change display interval to:
            display interval = (Upper Threshold*display
                interval)/(Buffer Level);
        Else
            Use original display interval.
```

In this way, if the number of video frames 144 represented in received frames buffer 140 drops below the lower bound threshold, the display interval is increased slowing down the video playing. If the number of video frames 144 represented in received frames buffer 140 rises above the upper bound threshold, the display interval is decreased speeding up the video playing.

In response to task 362, a task 364 is performed. At task 364, received video frame 144, associated with the received one of packet data structures 318, is reconstructed. Reconstruction entails translating the encoded data, i.e., coded blocks 224 of transform coefficients 212 (FIG. 14) and blocks 252 of coded motion vectors 246, into its original data.

A query task 366 is executed in conjunction with task 364. At query task 366, video frame reconstructor 142 of decoding section 120 (FIG. 6) determines whether there has been an unsuccessful transmission of video packets 139 that include transform coefficient packets 222 (FIG. 14), resulting in a loss of wavelet coefficients 212 (FIG. 10). When there has been an unsuccessful transmission of transform coefficient packets 222, decoding process 360 proceeds to a task 368. However, when transmission of transform coefficient packets 222 is successful decoding process 360 proceeds to a task 370 (discussed below).

An unsuccessful transmission of transform coefficient packets 222 is detected through an absence or corruption of video packets 222. Such might occur when one of wireless channels 46 is dropped, transmission signal strength fades excessively, transmission latency becomes too great, and so forth. In response, task 368 causes wavelet coefficient estimator function 146 (FIG. 6) to estimate wavelet coefficient 212 (FIG. 10) from adjacent ones of wavelet coefficients 212.

Figure 26:
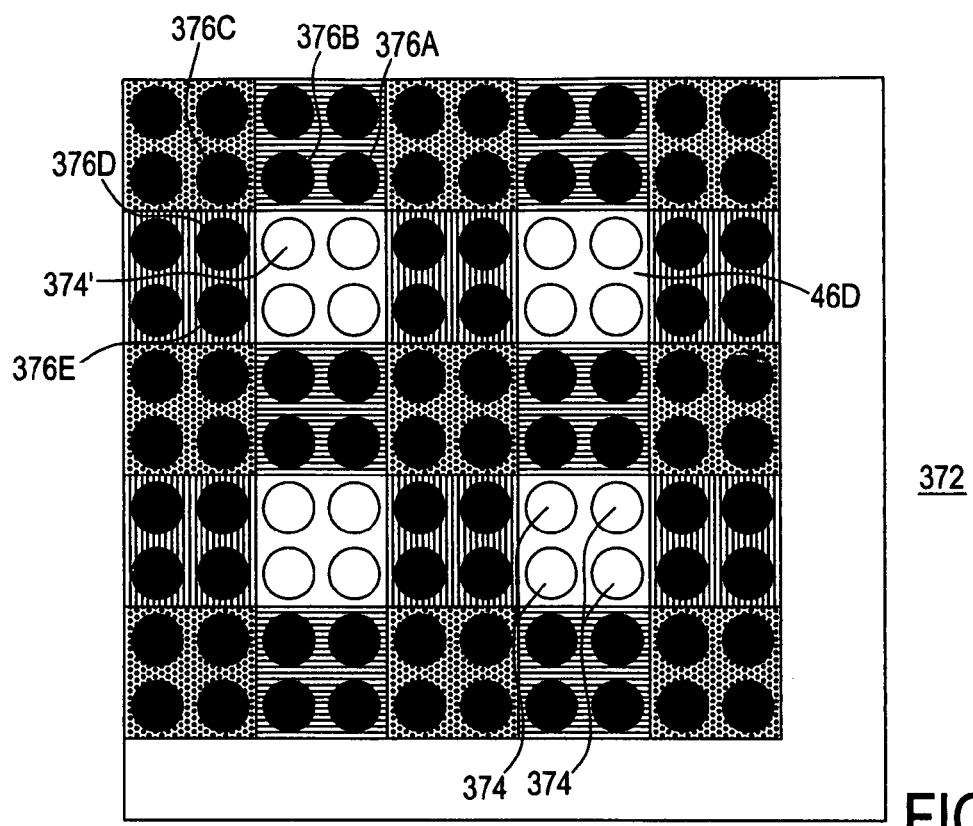
FIG. 26 shows a graphic representation of an error resilience scheme for lost transform coefficients determined through the execution of the decoding process of FIG. 25.

Referring to FIG. 26 in connection with task 368, FIG. 26 shows a graphic representation of an error resilience scheme 372 for lost ones of wavelet coefficients 212 determined through the execution of task 368 of decoding process 360. It should be recalled that wavelet coefficients 212 were split in such a manner as to facilitate estimation of lost waveform coefficients 212. Error resilience scheme 372 relies on knowledge of the loss pattern. In particular, video packet identifier 228 (FIG. 14) enables identification of neighboring waveform coefficients for reconstruction.

As shown in FIG. 26, a loss of one of channels 46, in this case fourth channel 46D is represented by the absence of fourth pattern 242 (FIG. 18). If one of channels 46, for example, fourth channel 46D is lost, this corresponds to a loss of groups of four wavelet coefficients, in the lowest frequency subband $LL_3$, in addition to lost groups of wavelet coefficients in other subbands of wavelet coefficients 212 (FIG. 11). The lost wavelet coefficients in subband $LL_3$ are represented by four empty circles 374. The lowest frequency subband $LL_3$ contains most of the energy in the image, so reconstruction of subband $LL_3$ will have the greatest impact on overall image quality. If only one of channels 46 is lost, each of lost wavelet coefficients 374 has five closest neighbor, or adjacent, coefficients 376 which can be used to form an estimate. By way of example, a first lost wavelet coefficient 374' has five adjacent coefficients 376A, 376B, 376C, 376D, and 376E.

It has been discovered that median filtering provides optimal results in terms of peak signal-to-noise ratio and visual quality. Through median filtering, the median value of adjacent coefficients 376A, 376B, 376C, 376D, and 376E is calculated to obtain lost wavelet coefficient 374'. As such, each lost wavelet coefficient 374 in the $LL_3$ subband is replaced by:

$$X_{lost}=\text{median}(X_1 \ldots X_5) \quad (5)$$

where $X_1 \ldots X_5$ are the five available closest adjacent coefficients 376.

If two of channels 46 are lost, each lost wavelet coefficient 374 will have three closest adjacent coefficients 376, $X_i$ (i=1, 2, 3), which can be used to form a reconstruction as follows:

$$X_{lost}=\text{median}(X_1 \ldots X_3) \quad (6)$$

Following the estimation of lost wavelet coefficients 374 from adjacent coefficients 376 at task 368, or upon determination that there are no lost wavelet coefficients 374 at query task 366, decoding process 360 proceeds to query task 370.

Like query task 366, query task 370 is also executed in conjunction with reconstruction task 364. At query task 370, video frame reconstructor 142 (FIG. 6) of decoding section 120 (FIG. 6) determines whether there has been an unsuccessful transmission of video packets 139 that include motion vector packets 244 (FIG. 17) resulting in a loss of motion vectors 166 (FIG. 9). An unsuccessful transmission of motion vector packets 244 is detected through an absence or corruption of motion vector packets 244, as discussed above in connection with the loss of transform coefficient packets 222. When there has been an unsuccessful transmission of motion vector packets 244, decoding process 360 proceeds to a task 378. Task 378 causes motion vector estimator function 148

(FIG. 6) to estimate the lost motion vectors from an average of surrounding motion vectors. However, when transmission of motion vector packets 244 is successful decoding process proceeds to a query task 380 (discussed below).

Figure 27:
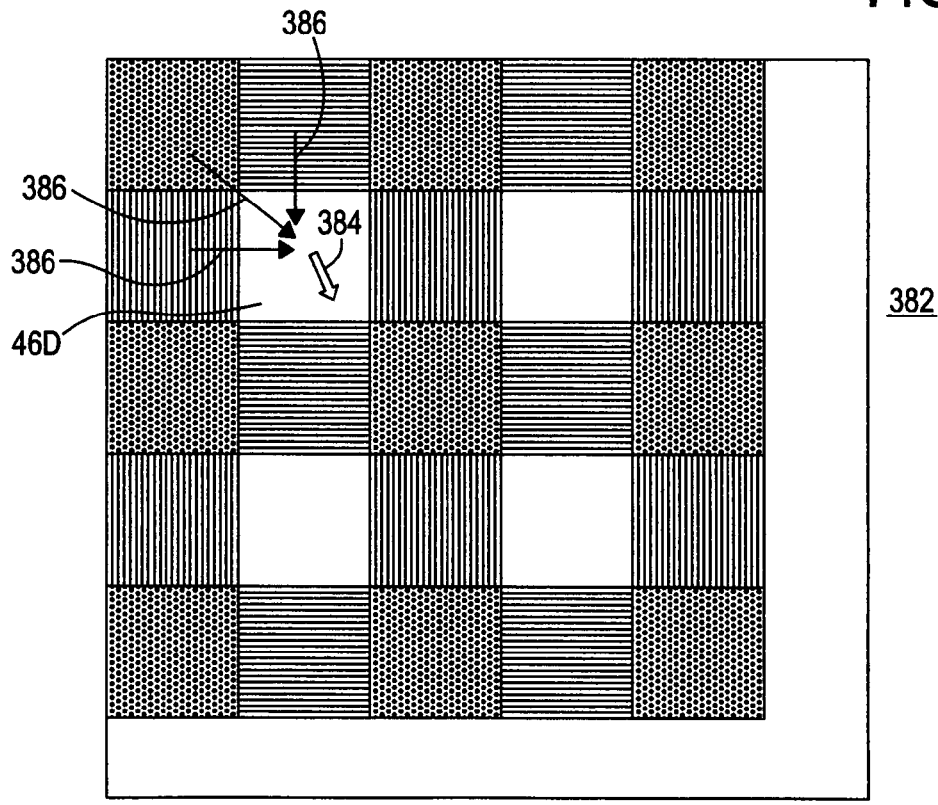
FIG. 27 shows a graphic representation of an error resilience scheme for lost motion vectors determined through the execution of the decoding process of FIG. 25.

Referring to FIG. 27 in connection with task 378, FIG. 27 shows a graphic representation of an error resilience scheme 382 for lost motion vectors determined through the execution of task 378 of decoding process 360. As shown in FIG. 27, a loss of one of channels 46, in this case fourth channel 46D is represented by the absence of fourth pattern 242 (FIG. 18). If one of channels 46, for example, fourth channel 46D is lost, this corresponds to a loss of motion vectors 166 transmitted on fourth channel 46D. The lost motion vectors are represented in FIG. 27 by an arrow 384 shown in outline form.

It should be recalled, however, that motion vectors 166 (FIG. 9) were split, separately coded, and distributed across the multiple wireless channels 46. As such, lost motion vectors 384 assigned for transmission via fourth channel 46D can be estimated from the average of surrounding motion vectors 386. Lost motion vectors 384 can then replaced by this average before applying motion compensation at decoder section 120 (FIG. 6) to reduce error propagation in the decoded bitstream.

Referring back to decoding process 360 (FIG. 25), following the estimation of lost motion vectors 384 from surrounding motion vectors 386 at task 378, or upon determination that there are no lost motion vectors 384 at query task 370, decoding process 360 proceeds to query task 380.

Query task 380 determines whether there is another packet data structure 318 (FIG. 24), associated with received frames buffer 140 (FIG. 24), that is to be decoded to produce another of received video frames 144. When there is another packet data structure 318, program control loops back to task 362 to receive and decode the next packet data structure 318. However, when query task 380 determines that there are no more data packet structures 318, decoding process exits 360. Accordingly, the encoding, transmit, receive, and decoding processes described above facilitate the transmission and reception of a real-time video signal over multiple voice optimized, low bandwidth, wireless channels.

In summary, the present invention teaches of a system and method for satellite-based transmission of video signals using multiple wireless channels. In particular, a video encoder/decoder system of the present invention employs an error-resilient, wavelet-based, multiple description video coding technique to effectively encode and split a real-time video signal for transmission over the multiple wireless channels. The encoding, signal splitting, and channel assignment schemes described herein facilitate the estimation of data lost during transmission, thus resulting in transmission that is resilient to packet loss on any individual wireless channel, as well as to loss of any individual wireless channel. In addition, the adaptive buffering technique utilized herein effectively accommodates transmission latency within the satellite-based communication network. Furthermore, the video encoding/decoding system and method facilitate transmission of successive video frames over multiple channels without the need for additional terrestrial or airborne infrastructure to the existing infrastructure of the satellite-based communication network.

Although the preferred embodiments of the invention have been illustrated and described in detail, it will be readily apparent to those skilled in the art that various modifications may be made therein without departing from the spirit of the invention or from the scope of the appended claims. For example, a great variation in the order of tasks may be contemplated.

What is claimed is:

1. A method of facilitating transmission of video frames over multiple channels in a communication system, said method comprising:
   for each of said video frames, generating frame data representative of said each video frame;
   transforming said frame data to obtain transform coefficients of said frame data;
   assembling quadtrees of said transform coefficients, each of said quadtrees including a group of said transform coefficients associated with an equivalent spatial location in said each video frame;
   separately coding said quadtrees to form coded quadtree coefficient groups, one each of said coded quadtree coefficient groups being associated with one each of a plurality of distinct spatial locations in said each video frame; and
   distributing said coded quadtree coefficient groups among said multiple channels for transmission, said distributing operation including assigning said coded quadtree coefficient groups to said multiple channels such that said coded quadtree coefficient groups representing adjacent ones of said distinct spatial locations in said each video frame will be transmitted over different ones of said multiple channels.

2. A method as claimed in claim 1 wherein:
   said generating operation generates said frame data and motion vectors; and
   said method further comprises:
      forming blocks of said motion vectors;
      separately coding said blocks to form coded motion vector blocks; and
      distributing said coded motion vector blocks among said multiple channels for transmission.

3. A method as claimed in claim 2 utilizing a Huffman coding algorithm to obtain said coded motion vector blocks.

4. A method as claimed in claim 1 further comprising forming said quadtrees into 16×16 coding blocks prior to said coding operation.

5. A method as claimed in claim 1 wherein:
   said transforming operation comprises performing a wavelet transform such that said transform coefficients are wavelet coefficients; and
   said coding operation comprises utilizing a zerotree wavelet coding algorithm.

6. A method as claimed in claim 1 wherein said coding operation comprises:
   assembling said coded quadtree coefficient groups into packets;
   for each of said packets, assigning one of said multiple channels for transmission of said each packet; and
   forwarding said each packet toward said assigned one of said multiple channels.

7. A method as claimed in claim 1 further comprising:
   assembling said coded quadtree coefficient groups into packets;
   attaching a packet identifier to each of said packets prior to said distributing operation;
   receiving said packets at a decoder via said multiple channels; and
   reconstructing said each video frame at said decoder from said received packets in response to said packet identifier.

8. A method as claimed in claim 7 wherein said reconstructing operation comprises:
   determining an unsuccessful transmission of one of said packets; and forming an estimate of said transform coefficients of said one of said packets in response to adjacent ones of said transform coefficients of others of said packets received via others of said multiple channels.

9. A method as claimed in claim 7 wherein said packet is a first packet, said packet identifier is a first packet identifier, and said method further comprises:
   generating motion vectors representative of said each video frame;
   forming blocks of said motion vectors;
   separately coding said blocks to form coded motion vector blocks;
   assembling said coded motion vector blocks into second packets;
   attaching a second packet identifier to each of said second packets;
   distributing said first packets and said second packets among said multiple channels for transmission;
   receiving said second packets at said decoder via said multiple channels, and said reconstructing operation reconstructs said each video frame from said first and second packets in response to said first and second packet identifiers.

10. A method as claimed in claim 9 further comprising:
    determining an unsuccessful transmission of one of said second packets; and
    estimating said motion vectors of said one of said second packets from an average of surrounding ones of said motion vectors of others of said second packets received via others of said multiple channels.

11. A method as claimed in claim 7 wherein said reconstructing operation comprises adaptively buffering said received packets.

12. A method as claimed in claim 1 wherein said communication system is a satellite-based communication network and said multiple channels are wireless voice channels managed by said satellite-based communication network.

13. A method of facilitating transmission of video frames over multiple channels in a communication system, said method comprising:
    for each of said video frames, generating frame data and motion vectors representative of said each video frame;
    transforming said frame data to obtain transform coefficients of said frame data;
    assembling quadtrees of said transform coefficients, each of said quadtrees including a group of said transform coefficients associated with an equivalent spatial location in said each video frame;
    separately coding said quadtrees to form coded quadtree coefficient groups, one each of said coded quadtree coefficient groups being associated with one each of a plurality of distinct spatial locations in said each video frame;
    forming blocks of said motion vectors;
    separately coding said blocks to form coded motion vector blocks; and
    distributing said coded quadtree coefficient groups and said coded motion vector blocks among said multiple channels for transmission, said distributing operation including:
    assigning said coded quadtree coefficient groups to said multiple channels such that said coded quadtree coefficient groups representing adjacent ones of said distinct spatial locations in said each video frame will be transmitted over different ones of said multiple channels; and
    assigning said coded motion vector blocks to said multiple channels such that adjacent portions of said motion vectors will be transmitted over different ones of said multiple channels.

14. A method of facilitating transmission of video frames over multiple channels in a communication system, said method comprising:
    for each of said video frames, generating frame data and motion vectors representative of said each video frame;
    transforming said frame data to obtain transform coefficients of said frame data;
    assembling quadtrees of said transform coefficients, each of said quadtrees including a group of said transform coefficients associated with an equivalent spatial location in said each video frame;
    separately coding said quadtrees to form coded quadtree coefficient groups, one each of said coded quadtree coefficient groups being associated with one each of a plurality of distinct spatial locations in said each video frame;
    forming blocks of said motion vectors;
    separately coding said blocks to form coded motion vector blocks; and
    distributing said coded quadtree coefficient groups and said coded motion vector blocks among said multiple channels for transmission, wherein said coded quadtree coefficient groups are distributed among said multiple channels independent from said coded motion vector blocks, and said coded quadtree coefficient groups are distributed such that said coded quadtree coefficient groups representing adjacent ones of said distinct spatial locations in said each video frame will be transmitted over different ones of said multiple channels.

15. A system for facilitating transmission of video frames over multiple channels in a communication network, said system comprising:
    an input for receiving each of said video frames;
    a processor in communication with said input for generating frame data representative of said each video frame;
    a wavelet transformer in communication with said processor for transforming said frame data to obtain wavelet coefficients of said frame data;
    a quadtree-based compressor for receiving said wavelet coefficients and assembling quadtrees of said wavelet coefficients, each of said quadtrees including a group of wavelet coefficients associated with an equivalent spatial location in said each video frame;
    a coder for separately coding said quadtrees to form coded quadtree coefficient groups, one each of said coded quadtree coefficient groups being associated with one each of a plurality of distinct spatial locations in said each video frame;
    an output interface in communication with said coder for receiving said coded quadtree coefficient groups, said output interface assigning said coded quadtree coefficient groups to said multiple channels such that said coded quadtree coefficient groups representing adjacent ones of said distinct spatial locations in said each video frame will be transmitted over different ones of said multiple channels;
    an input interface for receiving transmitted packets of coded quadtree coefficient groups from a second system via said multiple channels;
    buffer elements in communication with said input interface, one each of said buffer elements being associated with one each of said multiple channels, said input interface forwarding said transmitted coded quadtree coefficient groups received at ones of said multiple channels toward said buffer elements associated with said ones of said multiple channels;

a decoder in communication with said buffer elements for receiving said transmitted coded quadtree coefficient groups and reconstructing second video frames represented by said transmitted coded quadtree coefficient groups; and an estimator in communication with said decoder, wherein upon determination of an unsuccessful transmission of one of said packets, said estimator forms an estimate of said transmitted coded quadtree coefficient groups of said one of said packets in response to adjacent ones of said transmitted quadtree coefficient groups of others of said packets received via said multiple channels.

16. A system for facilitating transmission of video frames over multiple channels in a communication network, said system comprising:

an input for receiving each of said video frames;

a processor in communication with said input for generating frame data representative of said each video frame;

a wavelet transformer in communication with said processor for transforming said frame data to obtain wavelet coefficients of said frame data;

a quadtree-based compressor for receiving said wavelet coefficients and assembling quadtrees of said wavelet coefficients, each of said quadtrees including a group of wavelet coefficients associated with an equivalent spatial location in said each video frame;

a coder for separately coding said quadtrees to form coded quadtree coefficient groups, one each of said coded quadtree coefficient groups being associated with one each of a plurality of distinct spatial locations in said each video frame; and an output interface in communication with said coder for receiving said coded quadtree coefficient groups, said output interface assigning said coded quadtree coefficient groups to said multiple channels such that said coded quadtree coefficient groups representing adjacent ones of said distinct spatial locations in said each video frame will be transmitted over different ones of said multiple channels;

an input interface for receiving transmitted first packets of coded quadtree coefficient groups and second packets of motion vector blocks from a second system via said multiple channels;

buffer elements in communication with said input interface, one each of said buffer elements being associated with one each of said multiple channels, said input interface forwarding said transmitted coded quadtree coefficient groups received at ones of said multiple channels toward said buffer elements associated with said ones of said multiple channels; and a decoder in communication with said buffer elements for receiving said first and second packets and reconstructing said second video frames from said first and second packets.

17. A system as claimed in claim 16 further comprising an estimator in communication with said decoder, wherein upon determination of an unsuccessful transmission of one of said second packets, said estimator forms an estimate of said motion vector blocks of said one of said second packets from an average of surrounding ones of said motion vectors of others of said second packets received via said multiple channels.

* * * * *